United States Patent [19]
Horiuchi

[11] Patent Number: 6,160,916
[45] Date of Patent: *Dec. 12, 2000

[54] COMMUNICATION APPARATUS AND METHOD OF COLOR PICTURES AND CONTINUALLY-CHANGING TONE PICTURES

[75] Inventor: Takahiko Horiuchi, Morioka, Japan

[73] Assignee: Tsukuba Software Laboratory Co., Ltd., Iwai, Japan

[ * ] Notice: This patent is subject to a terminal disclaimer.

[21] Appl. No.: 09/120,460

[22] Filed: Jul. 23, 1998

[30] Foreign Application Priority Data

Aug. 11, 1997 [JP] Japan ................................. 9-230451

[51] Int. Cl.$^7$ ..................................................... G06K 9/36

[52] U.S. Cl. ............................................ 382/232; 382/241

[58] Field of Search ................................. 382/241, 153, 382/232, 240, 242, 243, 266, 272, 199, 294

[56] References Cited

U.S. PATENT DOCUMENTS 5,978,511  11/1999  Horiuchi et al. ........................ 382/241

FOREIGN PATENT DOCUMENTS

| | | | |
|---|---|---|---|
| 0 841 636 | 5/1998 | European Pat. Off. | G06T 9/00 |
| 40 05 492 | 8/1990 | Germany | G06K 9/46 |
| 6-83952 | 3/1994 | Japan | G06F 15/66 |
| 6-96199 | 4/1994 | Japan | G06F 15/66 |
| 6-348837 | 12/1994 | Japan | G06F 15/66 |
| 7-85268 | 3/1995 | Japan | G06T 5/00 |
| 96/02894 | 2/1996 | WIPO | G06K 9/36 |

OTHER PUBLICATIONS

Baseri et al., "Region–Based Coding of Images Using a Spline Model", Proceedings of the International Conference on Image Processing, vol. 3, No. conf. 1, 1994, p. 866–870.

Linnan Liu et al., "Optimal Contour Approximation by Deformable Piecewise Cubic Splines", Proceeding of the Computer Society Conference on Computer Vision a Pattern Recognition, 1991, 638–643.

Yasamuto et al., "Corner Detection and Curve Representation Using Cubic B–Splines", Systems and Computer in Japan, 1988, p. 73–80.

Eden et al., "On the Performance of a Contour Coding Algorithm in the Context of Image Coding Part 1: Contour Segment Coding", Signal Processing Euorpean Journal Devoted to the Methods and Application of Signal Processing, vol. 8, No. 4, 1985, p. 381–386.

Liow, Yuh–Tay, "A Contour Tracing Algorithm That Prserves Common Boundries between Regions", Computer Vision Graphics and Image Processing, vol. 53, No. 3, 1990, p. 313–321.

"A Study on adaptable system model and its application to desktop publishing system" by Takahiko Horiuchi, Dissertation, University of Tsukuba, pp. 100–105, 1995.

*Primary Examiner*—Jose L. Couso
*Assistant Examiner*—Duy M. Dang
*Attorney, Agent, or Firm*—Pillsbury Madison & Sutro LLP

[57] ABSTRACT

A sending port makes compressed digital data of continually-tone changing picture or color picture by inputting the continually tone changing picture or color picture, dividing the original picture into regions having pixels of similar tones, making an average tone image by drawing the regions with the average tones, determining boundaries between neighboring regions, extracting branch points at which more than two boundaries joins, extracting turning points at which the gradient turns discontinuously, approximating subboundaries having ends of turning points or branch points by piecewise polynomials, making a subtracting image by subtracting the average tone image from the original picture, and sending the compressed data; transmitting media transmits the compressed data from the sending port to a receiving port through telephone lines, exclusive lines or wireless; the receiving port retrieves the boundaries, the regions, the average tone image, the subtracted image and the original picture.

4 Claims, 9 Drawing Sheets

Input Picture

Average-Tone Image

Boundaries

Branch Points

Turning Points

Differential Image

Revived Picture

Input Picture

Average-Tone Image

Boundaries

Branch Points

Turning Points

Differential Image

Revived Picture

Encoded data and communication data

Original Picture (data-sending side)

Original Picture (data-sending side)

Revived Picture (data-receiving side)

Revived Picture (data-receiving side)

Reduced Sized Picture

Original Picture

Enlarged Sized Picture

COMMUNICATION APPARATUS AND METHOD OF COLOR PICTURES AND CONTINUALLY-CHANGING TONE PICTURES

BACKGROUND OF THE INVENTION

1. Field of the Invention

This invention relates to a communication apparatus and method of monochromatic continually-changing tone pictures and color continually-changing tone pictures. Here, the continually-changing tone picture is defined as a picture having a great variety of modes of tone images continually changing, which differs from monochromatic binary tone pictures and color binary tone pictures that consist of white regions and black regions (or color regions). This invention proposes not an image processing apparatus itself but a communication apparatus excellent in high quality and high speed. Since a color picture can be resolved to three or four primary color pictures having continually-changing tones, each of the resolved primary color pictures can be treated by the same method as the monochromatic continually-changing tone pictures. Therefore, it is feasible to reproduce a color picture by the steps of resolving an original color picture into primary color images, processing the primary color pictures separately, sending the data of the pictures from a sending port, receiving the data of the pictures at a receiving port and synthesizing the primary color images into a unified color picture.

Color resolution and color synthesis are prior technics frequently used for the treatment of color pictures. The gist of this invention exists in the communication processing of monochromatic continually-changing tone pictures. Thus, color pictures are able to be communicated by the same technology as monochromatic continually-changing tone pictures, because the color picture processing is practiced by dealing with individual monochromatic continually-changing tone pictures of primary colors independently. The following explanation mainly gives the processing of monochromatic continually-changing tone pictures.

Recent technical breakthroughs of networks, as the Internet typically represents, are burgeoning. Data are communicated by manifold means of not only conventional telephone lines but various exclusive lines. Further, the wireless communications, for example, pocket telephones, PHSs and so on, are generally expanding day by day. A great amount of data can be easily transmitted between remote places. The Multimedia are going to establish a valid position as a main flow of the information technology. The communication of pictures is the most important subject of the current information technology.

In general, the conditions required for the communication of picture images are as follows:
1. Beautiful and clear picture
2. A small amount of data, that is, a short communication time High picture quality is an indispensable requirement. This request is getting rigorous due to multiple purposes. It is not practical to take too much time for obtaining high picture quality in fear of the degradation of the quality of picture. A small amount of data, in other words, a short communication time is an essential requirement.

Recently, transmitted images are not only used as they are but also are used for other applications in a great variety of service fields, e.g. digital publications and so on. Hence, the services of picture processing are not restricted within the regeneration of pictures but are expanding to various treatments, for example, the enlargement or the reduction of an object picture in an arbitrary scale, free laying out at an arbitrary position, the printing of the processed pictures and so on without losing the quality of picture. Thus it is ardently desired that transmitted pictures are easy to be processed to various sizes of pictures and so on, and various kinds of picture components are able to be dealt with.

To satisfy these requirements, it is necessary to provide a new communication apparatus using picture formats capable of processing various kinds of picture types and of giving high quality regeneration of pictures, even when the pictures should be transformed in various sizes or into various orientations. In addition, it is essential that the data of pictures are compressed so as to curtail the amount of data and the processing time (including the time of transmitting).

The picture types intended by this invention include, for example, photographs, calligraphic characters, printed characters, illustrations, logomarks and so on. Sizes of pictures are arbitrary, and any color picture with continually-changing tones is available.

Here, the continually-changing tone picture means a picture in which the tone (intensity) of a certain primary color is continually changing spatially. This invention includes color pictures besides monochromatic continually-changing tone pictures. A color picture is able to be resolved into several primary color pictures having continually-changing tones, and be reduced to a monochromatic continually-changing tone picture of every color. For example, when a color picture is resolved into four primary colors, it has four monochromatic continually-changing tone pictures with respect to each primary color, so that individual treatments are practiced on every primary color.

This invention aims at processing the pictures as an aggregation of a plurality of primary color pictures in which tones (intensities) widely vary in succession.

Here, a continually-changing tone picture is used as an antonym of a simple two-value picture (binary tone picture) that is briefly constructed with the regions of black and the extra regions of white. Thus, the objects of the present invention include not only tone-changing monochromatic pictures but also tone-changing color pictures. According to the definition of the word of "continually-changing tone picture" alone, it seems to exclude binary tone pictures. This invention is, however, also capable of processing both binary tone pictures and continually-changing tone pictures due to its affluent generality. Thus, this invention is excellent in versatility.

This invention is likely to say "Communication apparatus and method of pictures", but is titled as "Communication apparatus and method of color pictures and continually-changing tone pictures", because this invention is capable of processing continually-changing tone pictures that are extremely difficult in processing in comparison with binary pictures. And further, the word of "color" is inserted to the title, because this invention is defined as the technology for not only monochromatic two-value pictures but also color continually-changing tone pictures. Hence, this title shows that this invention enables to process multiform pictures.

This invention enables to input an original continually-changing tone picture by a picture reading apparatus or a picture inputting apparatus, obtain multivalued data from the inputted picture, eliminate noises, reduce the amount of data without losing inherent features of the continually-changing tone picture, compress the data, transmit the compressed data via telephone lines, exclusive lines, or electric waves, and retrieve the original continually-changing tone picture from the transmitted data.

In particular, this invention implements the steps of automatically transforming an original picture with continually-changing tones to digital data, transmitting these digital data to remote places via various media, retrieving the original picture from the digital data in an arbitrary scale, and utilizing the retrieved picture via a printing apparatus or a computer.

In the case of a color picture, this invention dissolves preparatively a read-in original color picture into four or three primary color monochromatic pictures, processes the primary color monochromatic pictures independently to digital data, eliminates noises from the digital data, reduces the amount of data, compresses the data, transmits these digital data to remote places via various media, regenerates each primary color picture from the compressed data without losing inherent features, and synthesizes the primary color pictures into a single continually-changing tone color picture.

2. Description of the Prior Art

This application claims the priority with respect to Japanese Patent Application No.230451/1997 filed on Aug. 11, 1997 which is incorporated herein by reference.

Conventional communication apparatuses are able to transmit coded-data such as characters and so on without the degradation of picture quality as digital data because of a small amount of data, but are fully unable to transmit a continually-changing tone picture that has never been coded without reducing the quality of picture in a short time because of a great amount of information. Any practical technology, which is able to transmit pictures with an extremely large amount of information in a short time without degrading the quality of the pictures, has never been contrived yet.

Three types of current data compressing methods will be disclosed instead of communication technique. Here, we emphasize the fact that there yet exists no practical communication technology for transmitting the compressed data of a continually-changing tone picture via telephone lines or exclusive lines.

Three current methods of compressing data are (A) BIT MAP DATA METHOD, (B) DISCRETE COSINE TRANSFORMATION METHOD (DCT METHOD) and (C) FUNCTION-APPROXIMATION METHOD. (A) is a method of transmitting data without compressing the data. (B) and (C) are methods of compressing data but are not yet put into practical use for communication.

These three methods will be explained in detail as follows:

(A) Bit Map Data Method

This is a method of transmitting bare continually-changing tone values of all pixels of a picture input from an image reading apparatus, for example, a scanner without data processing. This method seems to be a sole method realizing the transmission of images at present. Here, the bit map means a set of pixels having continually-changing tone values of a picture. This method transmits the tone values of all the pixels without compressing and processing them.

For example, facsimiles (both binary and multi-valued facsimiles) widely prevailing nowadays adopt this bit map data method. Here, data are changed from analog signals to digital signals, and the digital signal data are encoded, for example, by the Huffman encoding. Encoding process is directed to protect the secret of the data, being accompanied by some decrease of data. Data of pictures themselves are not compressed. Therefore, it is safely said that the bit map method directly transmits numerous data of a picture as they are. Any sort of picture types is possible to be sent because of the direct transmission of data. This method is an extremely simple one, but has serious drawbacks, which will be pointed out in the next stage.

1. First drawback is that received pictures are vague and unclear. Here, the interval between individual pixels is called a "sampling interval". If the sampling interval became smaller, it would take longer time to transmit data. Therefore, a picture is usually sampled with a rough interval, which results in an unclear transmitted picture. If an original picture is small and complicated, it is impossible to receive a picture keeping inherent features of an original picture. Transmitted picture loses features inherent in the original picture. Further, since image data are read optically, noises often occur. Particularly, when original pictures are small in size, it is impossible to obtain clear reproduced pictures due to the processes of transmitting and regenerating. When a picture is sent via facsimiles more than twice, a transmitted picture becomes extremely vague due to an increment of noise. Poor and unclear regenerated picture is one of the most serious faults in this method.

2. Second drawback is that a retrieved picture is equal to an original picture in size. Hence, the reduction and enlargement of a retrieved picture are impossible for this method. There exists no freedom of processing. A transmitted picture is able to be enlarged or reduced in size by a copy machine, which brings about a much poorer and unclearer picture that is mostly useless. The degree of freedom of data processing is zero as long as bit map data are processed.

3. Third drawback is that the amount of data is so vast, which is a fatal fault. A large amount of data expenses much time and money in transmitting the data. Therefore, a means of reducing such a large amount of data is desired.

Fault 1 might be conquered to some degree by shortening sampling intervals, and whereby a transmitted picture would keep more features inherent in an original picture. If so, the amount of data would be increased, which results in expending far more time and money for transmitting the data.

Technologies of compressing data for transmission have been devised by making use of encoding systems, e.g. Run length coding Method, Modified Huffman Coding Method, and so on in order to shorten the time of transmitting data. Since these methods encode digital data directly, the compression of data is limited to a small extent. Such methods directly encode digital data, disregarding all features inherent in original pictures. To shorten the time of transmitting data, the sampling intervals of facsimile are still too wide, and whereby the quality of received pictures is still bad. A retrieved picture ends up with losing delicate and close features faithful for the original picture.

As explained hitherto, although the bit map data method is only a method that has already been realized in the transmission of data of a picture, the quality of transmitted pictures is bad. It is infeasible for this method to retrieve pictures to a satisfactory level of the quality of picture.

(B) Discrete Cosine Transformation Method (DCT Method)

This is a method of compressing the data of pictures and obtaining coefficients of the compressed data by using discrete cosine functions. The data compression by the discrete cosine transformation method is made use of by the standard compressing means of stationary pictures, e.g. JPEG and so on. This method is utilized only for the data compression but has never been put into practice for the communication of images. Since data are reduced by this compressing method, the data would easily be transmitted. Further, this method may be effective in a picture having smooth continually-changing tones but is incompetent for a picture in which the tones change drastically. In the concrete, a picture including discontinuing tones is suffering from block distortion and edge degeneration. The incompetence for quick-changing tones induces a fatal drawback of degrading the quality of a picture composed of various types of images, for example, photographs, calligraphic characters, printed characters, illustrations, logomarks and so on. Furthermore, the DCT method still lowers the quality of a picture accompanying enlargement or reduction. Therefore, this DCT method is unsuitable for such data treatments as enlargement, reduction, transformation and so on.

(C) Function-Approximation Method

This is a method of approximating a picture by expressing picture image components as combinations of basic functions and reducing the picture to the coefficients of functions. Approximation methods based on this idea have been disclosed in prior documents, that is, Japanese Patent Laid Open No.6-83952, Japanese Patent Laid Open No. 6-96199, Japanese Patent Laid Open No.6-348837 and Japanese Patent Laid Open No.7-85268. These methods are fully incompetent to continually-changing tone pictures but are effective to binary tone pictures of characters, illustrations and so on that have only white pixels and black pixels. Outlines of a binary tone picture are approximated by straight lines, circles, arcs and free curves in the order, and the outline parameters are stored in a memory. Hence, the outlines are expressed by straight lines, arcs, circles and free curves. This method is capable of compressing data by expressing a binary tone picture with simple figure elements.

This is, however, the method of approximating outlines of a binary tone picture consisting of only white pixels and black pixels. Therefore, this method is inadequate for continually-changing tone pictures that have no outlines. This method is absolutely useless for continually-changing tone pictures such as photographs in which peripheral lines cannot be clearly defined. Further, these prior methods have not been practiced in use even for transmission of binary tone pictures.

Any technology capable of transmitting continually-changing tone pictures by the function approximation method has never been realized yet.

It is no exaggeration to say that any transmitting technology has never succeeded in reducing the data amount of a continually-changing tone picture, transmitting the picture without losing features inherent in an original picture, retrieving a transmitted picture with maintaining inherent features and processing the transmitted picture into various forms, e.g. enlargement, reduction, deformation and so on. In the conventional bit map data method, the inherent features of an original picture are blurred and the quality of picture is degraded. A shorter sampling interval between pixels would be effective to transmit data more faithful to the original picture, which would incur in a great amount of data and a lot of processing time. Therefore, it is impossible to shorten the sampling interval so much. As a result, this bit map data method cannot avoid the degradation of quality of picture caused by transmitting.

DCT method is capable of compressing data, but the quality of picture is very bad when various image types are intermingled in a picture. It is infeasible to enlarge or reduce an object picture in size without degrading the quality of the picture. DCT method has not yet attained the use in practice as a picture communication technology.

As mentioned above, there exists no effective method for processing continually-changing tone pictures by using the function-approximation method, as satisfying the above described requirements.

It is convinced that there exists no technology for transmitting fine continually-changing tone pictures with enjoying high quality in a short time together with another processing, for example, enlargement, reduction and so on. The recent development of communication systems ardently desires the realization of the transmission of continually-changing tone pictures more and more.

Conventional image transmitting technologies can not transmit pictures that requires extremely high accuracy like a block copy of printing. There is no means for sending such a picture requiring extremely high accuracy to other places except enclosing it in an envelope and sending the envelope by mail. It takes a few days to send a picture. It would be extremely convenient, if a new technology can send a picture endowed with high accuracy in an instant, maintaining inherent features faithful in an original picture. If so, we are released from the anxiety about the delay of transport.

SUMMARY OF THE INVENTION

One of the most important objects of this invention is to propose a communication apparatus and method of transmitting color pictures and monochromatic continually-changing tone pictures which is excellent in transmitting time, capability of transformation and quality.

This invention provides an apparatus and method for transmitting pictures composed of continually-changing tone images via telephone lines and so on without losing its inherent features. This apparatus will overcome the difficulties that the conventional methods, e.g. Bit map method, DCT method and Function-approximation method, have never solved.

Subjects of this invention are now described in brief;
1. Reduction of the labor of transforming continually-changing tone pictures to a certain data form for transmitting them,
2. Feasible enlargement, reduction and transformation of continually-changing tone pictures with high quality, and
3. A small amount of data for transmitting continually-changing tone pictures This invention aims to send, e.g. a block copy of printing easily via telephone lines or exclusive lines, maintaining the quality of picture. To achieve it, this invention must have a simple processing for reducing the data on an object picture to a certain form suitable for transmitting in a short time. Further, this invention should be equally applied to any kind of picture types.

The communication apparatus of the present invention has the functions of; dividing the whole picture into a plurality of regions having a similar tone, obtaining boundaries between the regions as two-dimensional information, compressing the information automatically, extracting the continually-changing tones of every region as three-dimensional information, compressing these data automatically, and transmitting all the compressed data from a transmitting port, and receiving and refining all compressed data at a receiving port, obtaining all boundaries, regenerating continually-changing tones of every region, and reproducing a picture in the whole in an arbitrary size at an arbitrary position. In addition to the data compression of the present invention, the data should be encoded by some conventional encoding method so as to protect secrets, whereby the time for transmitting data is further shortened.

If the computer had a sufficient ability of processing all of an original picture, it would be possible to process the entirety of the picture at a stretch. If the computer is insufficient, it would be possible to divide an original picture into a plurality of blocks lengthwise and breadthwise to deal with the divided blocks of continually-changing tones block to block. The processing of the entirety of a picture is just equal to a sum of the processings of a divided blocks. Hence, the processing of continually-changing tone images means that the data of the continually-changing tone images in the blocks are compressed and encoded automatically.

The communication apparatus of continually-changing tone pictures of the present invention includes two mechanisms, that is, two systems of a sending port and a receiving port. The sending port processes a picture of continually-changing tones by the steps of optically reading-in the pictures or electronically reading-in the pictures, abstracting regions in which the tone differences between the pixels are small on the inside of the region and the tone differences between the outside pixels and the inside pixels are large, calculating average tones for the regions, expressing the abstracted regions with the average tones, making an average picture consisting of average tones, extracting boundaries between the regions, extracting branch points dividing more than three regions on the boundaries and abstracting turning points at which the boundaries change the direction discontinuously on the boundaries. These branch points and turning points are called characteristic points. A boundary is divided into boundary intervals by the branch points. A boundary interval is further divided by the turning points into partial lines. Every partial line divided by the turning points and the branch points is a curving or a straight line having both ends. The partial lines of the boundary intervals are now called "subboundaries" in this specification. The point series on the subboundaries are approximated by some simple functions. Since every subboundary has no singular point like the turning point or the branch point, every subboundary can be approximated by low order polynomials. Once the subboundary is approximated by some functions, i.e. primary (single) variable spline functions, all the data of individual coordinates of the point series on the subboundaries are abandoned. The abandonment of individual coordinates of the point series on the subboundaries reduces the amount of the data of the boundaries.

In the next stage, a differential (subtraction) image is made from the difference between the original picture and the average-tone picture with the regions painted with their own average tones. The differential image is approximated by a curved tone surface capable of mostly approximating the spatial change of tones. In this approximation, two variable B-spline functions are used. Data of continually-changing tones are denoted by parameters on the spline functions of this curved tone surface. The original tone values of each pixel are abandoned after the approximation, and whereby the amount of data regarding the information of continually-changing tones is extremely reduced. Hence, there are two kinds of data approximations, that is, the two-dimensional approximation of boundaries and the three-dimensional approximation of differential images.

The compression can not only reduce the amount of data but also eliminate noise and supply a clean picture. For example, when there is a fine noise such as a speckle dropped on a picture having a smooth continually-changing tone, this invention soon perceives that this is a smoothly curved surface, and expresses it as a smooth curved-surface by excluding the noise. The method of compressing continually-changing tone pictures has been disclosed in detail in Japanese Patent Application No.8-317017 (317017/1996) invented by the Inventor of the present invention. This compressing method will be explained in detail afterward.

These compressed data are encoded by the prior, general encoding technology. The encoded data are stored in the order in a memory apparatus. Since these encoded data are parallel digital ones, they are changed to serial data as communication data. The communication data are transmitted by a transmitter. The above is a brief explanation of the processes carried out on the sending side.

Transmission mediums are arbitrary, for example, telephone lines, exclusive lines, electric waves, optical fiber webs and so on are available. A host computer is sometimes interposed between the sending side (port) and the receiving side (port). Transmission distance is also arbitrary. It is feasible to transmit communication data to not only domestic but foreign receiving apparatuses.

The receiving side receives communication data and memories the data that have been encoded and transmitted. Firstly, the encoded data are decoded. Since decoding is the reverse of encoding, prior methods are available for decoding. Since parameters of a curved surface approximating a differential image are given, the differential image is regenerated based on these parameters. When the sending side has processed the entirety of a picture to a differential image, the receiving side regenerates the entirety of the picture as it is. If the sending side has divided a differential image into several differential image blocks and all the divided differential image blocks have been approximated, the receiving side retrieves the differential image blocks every region, and these retrieved differential image blocks are synthesized as a whole.

As a result, the whole differential image is revived on the receiving side (port).

In the next stage, boundaries are retrieved between on the characteristic points, i.e. the branch points and the turning points of boundary point series and the parameters of curved lines capable of approximating boundary intervals and subboundaries between characteristic points. The regions enclosed by boundaries are painted by the average tones, and whereby an average image is restored. A picture being the same as an original picture in quality is obtained by adding the differential image to the average image. It is possible to output a picture by means of printing and so on. Further, arbitrary enlargement and reduction in size, rotation movement and parallel movement are possible by changing function parameters, because boundaries and continually chanting tone values are shown by function values. The quality of picture is never degraded, even if various kinds of transformation are done.

BRIEF DESCRIPTION OF THE DRAWINGS

FIG. 1 is an outline of the transmitting device of the present invention in which the data of an original picture are compressed, the compressed data are transmitted by transmitting mediums to the sending side, the original picture is copies from the data transmitted by the receiving side and the copied original picture is regenerated by a printer, screen and so on.

DETAILED DESCRIPTION OF THE PREFERRED EMBODIMENTS

The communication apparatus and method of the present invention enable to transmit color pictures and monochromatic continually-changing tone pictures, being endowed with high quality, short transmitting time and high flexibility.

Figure 1:
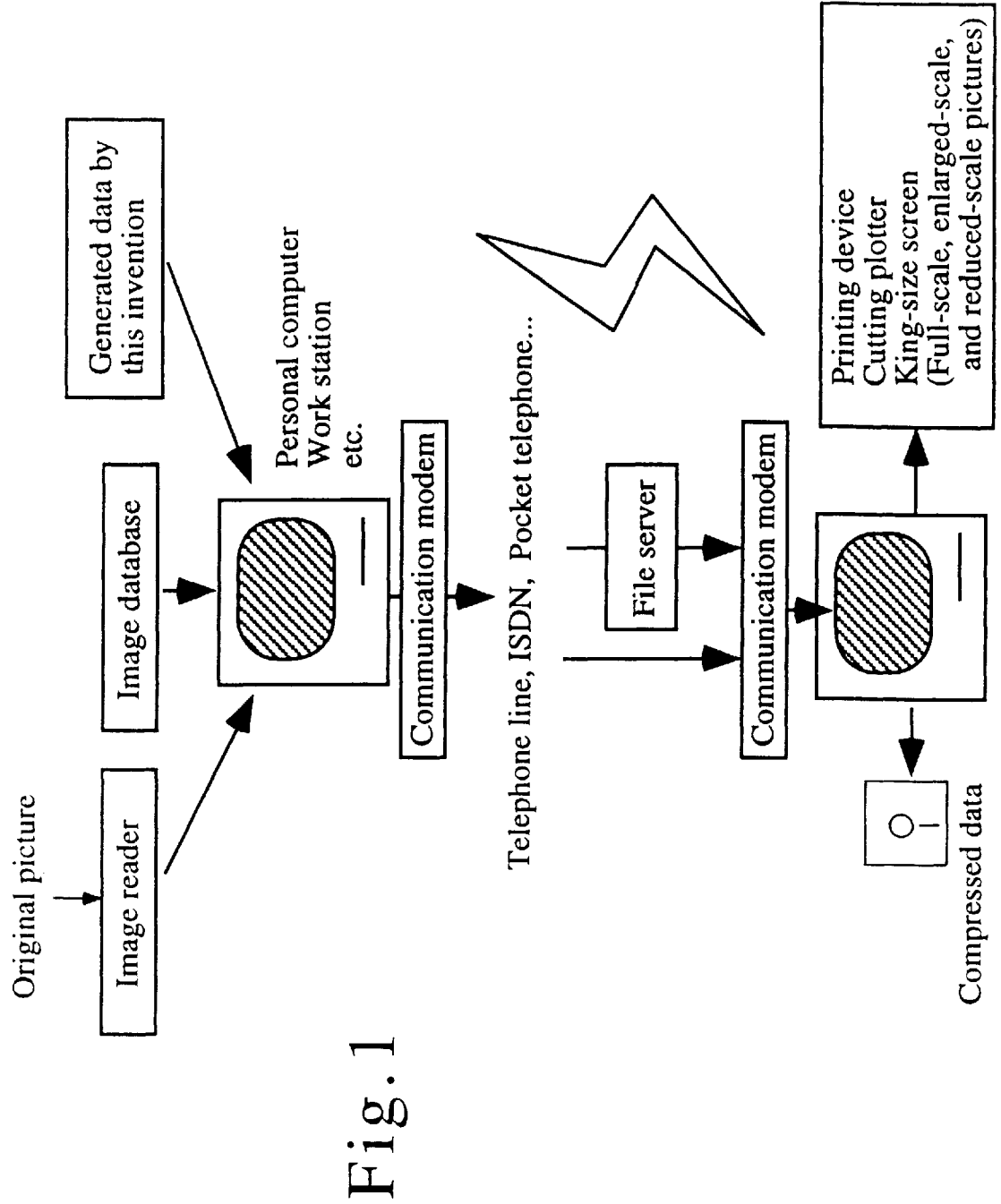

FIG. 1 shows a schematic block diagram for explaining a data transmitting apparatus of the present invention. A communication apparatus implementing the method of the present invention is previously installed into a computer, a work station and so on. When an original picture painted on a paper is sent, the original picture is read out by an image reading apparatus, for example, an image scanner and so on, and is input into a computer and so on. When a picture stored in an image data base is sent, the picture is directly displaced from the image data base into a computer and so on. Further, the data compressed by the method of the present invention can be input in a computer for sending the compressed data.

The above-mentioned treatments, such as the boundary extraction, the boundary approximation, the average image extraction, the differential image extraction, the differential image approximation, the encoding and so on, are carried out in the computer, the work station and so on. The compressed data are transmitted by a modem for communication. Transmission mediums are telephone lines, exclusive lines, wirelesses and so on. When telephone lines or exclusive lines are connected with commercial providers, a commercial host station's computer is interposed therebetween. In this case, subscribers have their own code numbers or passwords for protecting the secret of communication. A membership fee is decided for every commercial host. The communication method of the present invention needs no providers therebetween, but is capable of communicating through commercial computers.

On the receiving side (port), communication data are reverse-changed by a communication modem connected with telephone lines, exclusive lines or wirelesses, and are input into personal computers or work stations. A computer on the receiving side is previously installed with the communication apparatus of the present invention. Compressed and encoded data are received on the receiving side (port). A small volume of data alleviates the time for transmitting, which brings the benefit of reducing the telephone fee. The receiving side (port) receives the compressed and transmitted data by the communication method of the present invention. It is feasible to memorize the compressed data as they are in a memory apparatus.

Furthermore, this invention enables the receiving port to retrieve the original picture by reverse-changing the compressed data at or after the moment of reception of the compressed data. The retrieved data are visually output via a printer, a large picture display, a cutting plotter and so on. In spite of the small amount of transmitted data, the boundaries and continually-changing tones expressed by successive functions enable the receiving port to regenerate a picture faithful to the original picture. The retrieved picture can freely be reduced or enlarged.

The gist of this invention is to provide an apparatus and a method having the steps of dividing an original picture with continually-changing tones into a plurality of regions of similar tones, seeking boundaries between the different regions, dividing the boundaries by the characteristic points, i.e. branch points and turning points, obtaining smooth differential images with only low frequency components by extracting an average tone picture from the original picture, approximating the subboundaries and the differential images by one variable and two variable partial polynomials respectively for compressing all the data of the continually-changing tone picture, transmitting the compressed data from the transmitting side to the receiving side, taking out the information regarding the boundaries from the compressed data, retrieving the regions and the differential images by the partial polynomials, and regenerating a picture of the original picture on the receiving side (port).

For a color picture, this invention preparatively dissolves the read-in original color picture into three or four primary-color pictures, processes the individual primary-color monochromatic pictures independently in the same manner, reducing the amount of data, compressing the data and transmitting the compressed data to the data-receiving side in which each primary-color picture is regenerated from the data and a single continual-tone color picture is retrieved by synthesizing the primary-color pictures.

When an object picture is a simple binary picture, the boundaries are just equal to the outlines of the picture, and a differential image, which is defined by a difference between an original picture and an average-tone image, only becomes a flat surface with uniform tones. Such a binary picture is able to be compressed and transmitted by the method of the present invention. Hence, various modes of pictures, e.g. binary pictures, continually-changing tone pictures and color pictures, are dealt with by this invention. This invention implements farreaching versatility.

This invention represents a picture in a series of functions, so that a regenerated picture overcomes the degradation of quality. This invention is superior to the bit map method in image quality, transmitting time and flexibility. Furthermore, since this invention extracts edge parts having steep tone changes as boundaries, and approximates the boundaries and the regions by functions, the deformation and the degradation of the edge parts, which was the serious fault of the DCT method, never occur.

Figure 2:
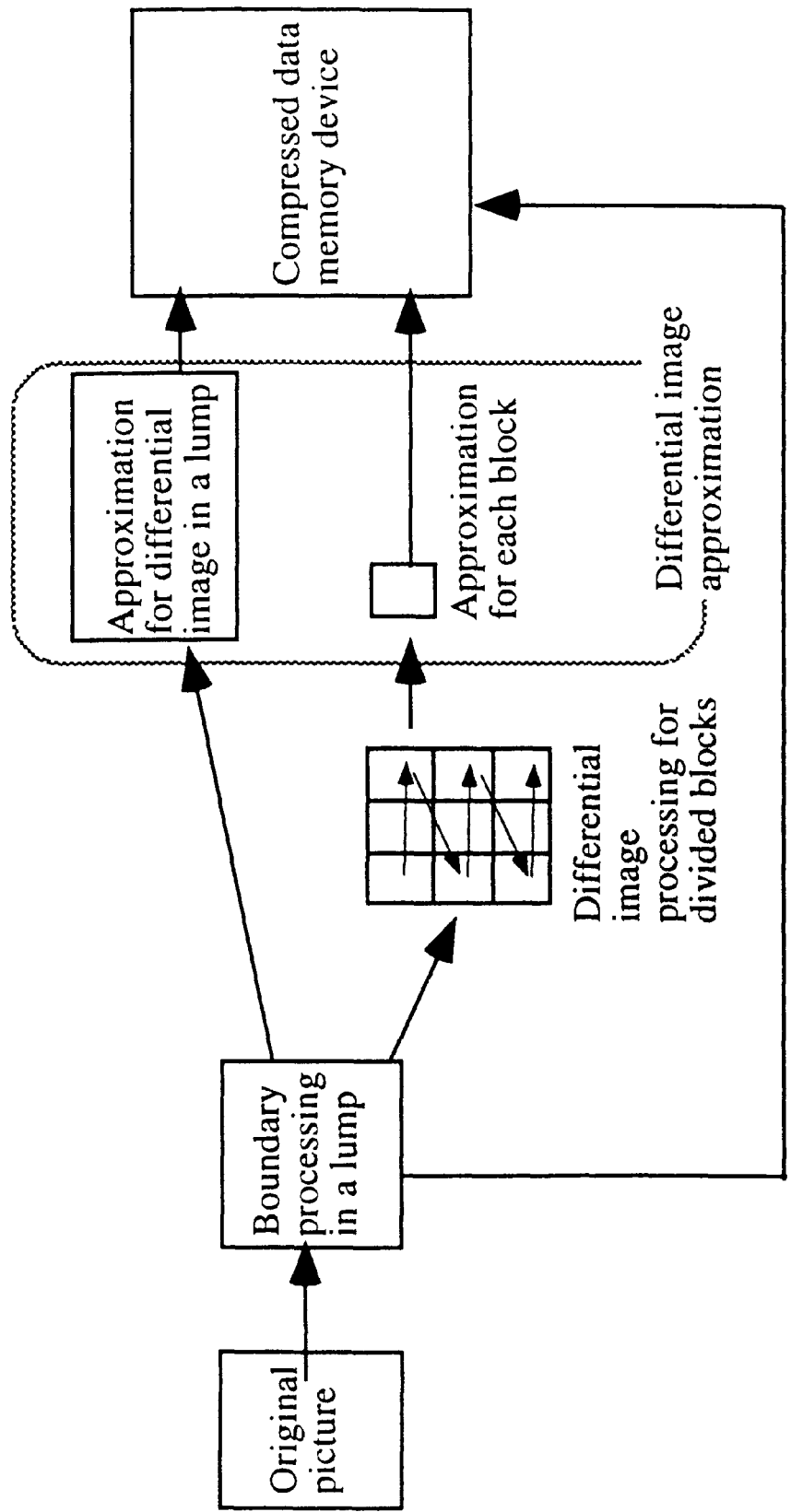
FIG. 2 is the steps of the present invention in which the sending side reads the original picture, defines the regions approximated by tones, requires the borders, paints the regions with average-tones, requires the differential image produced by deducting the average-tone every region, and the differential images are approximated by functions.

The above description hitherto is an outline of the present invention. The boundary-extracting and the boundary-approximating are processed as a whole in the input continually-changing tone picture. But differential images are processed and compressed not only as an entire picture but also as every divided block, which is shown by FIG. 2. Such a bulk processing is suitable if the ability of computer is sufficient. If the ability of computer is limited, the differential images should be processed and compressed in every divided block, and their data are memorized for every divided block and are transmitted. The regeneration of continually-changing tone picture is carried out for every divided block also on the receiving side (port). The regenerated divided blocks are summed up for retrieving the original picture.

This invention, of course, allows both the bulk processing method and the division processing method. Both processing methods are the same in their manners, but are only different from each other in the range of processing. Since the bulk processing method is easily known from the division processing method, the division processing method will mainly be explained hereafter for avoiding redundancy. An object picture is here divided into a plurality of blocks each of which has a constant area (size) without considering the content of the object picture, and the image is a sum of the divided blocks. It is the simplest to take a divided block as a square having sides of a common divisor of a total longitudinal pixel number and a total horizontal pixel number. But it is available to adopt a rectangle as a divided image block. The size of a divided block is able to be, e.g., a square of 32 dots×32 dots. The size of a divided block should be determined in corresponding to the ability of computer.

Figure 3:
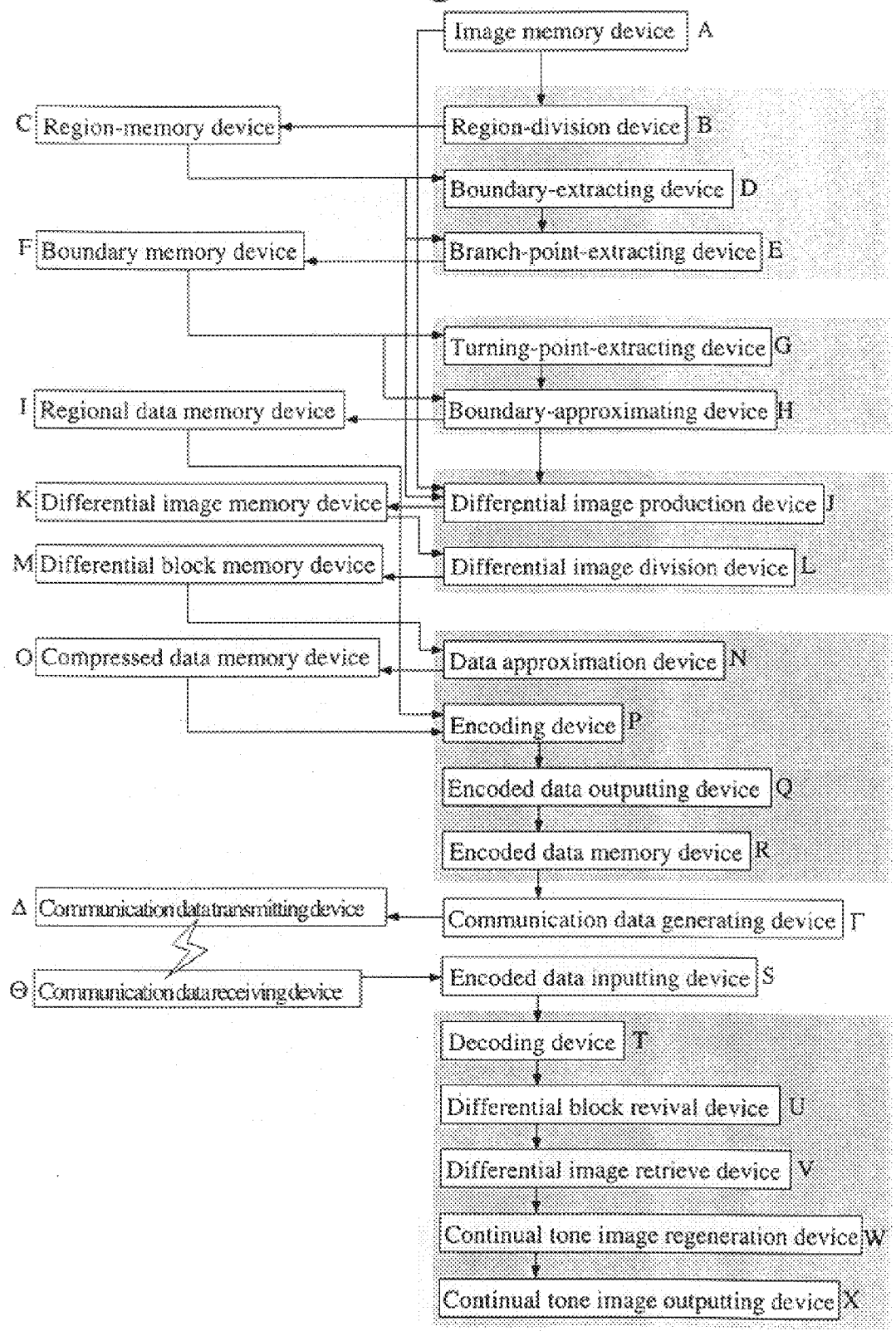
FIG. 3 is a block diagram showing all the devices of an inputting and outputting apparatus for continual-tone pictures which contain an image memory device, a region-generating device, a characteristic point deducing device, subtraction image generating device, an encoded data producing device, a regenerated data producing device and memory devices for storing the results of the arithmetic devices.

The following are the devices for constructing the communication apparatus of the present invention. These components are shown in FIG. 3 as a block figure that is helpful in understanding. As a whole, these devices are composed of a region-generating device, a characteristic point-extracting device, a differential image calculating device, an encoded data generating device, a retrieved data generating device and so on.

A. Image memory device
B. Region-division device
C. Region memory device
D. Boundary-extracting device
E. Branch-point extracting device
F. Boundary memory device
G. Turning-point extracting device
H. Boundary approximating device
I. Regional data memory
J. Differential image production device
K. Differential image memory device
L. Differential image division device
M. Differential block memory device
N. Data approximation device
O. Compressed data memory device
P. Encoding device
Q. Encoded data outputting device
R. Encoded data memory device
Γ. Communication data generating device
Δ. Communication data transmitting device
Θ. Communication data receiving device
S. Encoded data inputting device
T. Decoding device
U. Differential block revival device
V. Differential image retrieve device
W. Continually tone image regeneration device
X. Continually tone image outputting device The devices of A to Δ are installed on the data-transmitting side (port), and the devices of Θ to X are installed on the data-receiving side (port). The transmitting media, for example, telephone lines, exclusive lines, wirelesses and so on, intervene between the device Δ and the device Θ. Actually, one station often possesses both the data-transmitting devices and the data-receiving devices, because data are sent and received bilaterally.

The above system constituting of the devices of A to X is for monochromatic continually-changing tone pictures. When an input picture is a color continually-changing tone picture, the input color picture is resolved into primary-color monochromatic pictures by a color resolution device to begin with by the same processes in parallel. Data of each primary color picture are compressed, are encoded and are transmitted by the same manners. Each monochromatic primary-color picture is retrieved from the compressed encoding data of primary color tone, and a set of the primary-color pictures is synthesized. Hence, the following devices are necessary for color continually-changing tone pictures in addition.

Y. Color resolution device

Z. Color synthesis device

The above processes are related to the case of dividing a differential image into differential blocks with a constant area. If a computer has a sufficient ability of dealing with data, a differential image is treated as a whole without dividing. If so, the differential image division device L and the differential block revival device U are unnecessary.

The processing for encoding and decoding data is practiced before and after the transmission of data in order to reduce the transmitting data and to protect the secret. When the processing for encoding is unnecessary, the processes of encoding and decoding data are able to be omitted, that is, the devices of from P to R and the devices of from S to T are left out.

The devices of from A to Δ are apparatuses for the transmitting port, and the devices of from Θ to X are apparatuses for the receiving port. This invention is composed of the sophisticated processes of dividing a continually-changing tone picture into a plurality of regions having similar tones (densities), extracting and approximating boundaries, painting each region uniformly with an average tone, i.e. an average-tone image, making a differential image from the difference between an original picture and an average-tone image, approximating the differential image by pertinent two-dimensional functions and yielding the compressed data of expressing the differential image. Such processes are so complicated that it is difficult to understand the operation of this invention. Therefore, the processes of this invention will be previously explained by picking up practical cases of a continually-changing tone picture and a binary tone picture. The former is a picture with changing tones in succession, and the latter is a picture with two valued tones. The binary tone picture is deemed as the most simplified limit of a continually-changing tone picture, so that the binary tone picture can be treated by the same manner as the continually-changing tone picture. The binary tone picture should be explained as an example so as to clarify how much simplicity the continually-changing tone picture has.

[Continually-Changing Tone Picture Case]

The processes of transmitting a continually-changing tone picture will be explained by referring to an exemplary picture of the "SIDBA/Girl" shown in FIG. 4(a) to FIG. 4(g).

Figure 4A:
FIG. 4(a) is an original, starting picture of "SIDBA/Girl" as an example of continual-tone pictures.

First, an original photograph of the "Girl" is read in by an optical reading apparatus, for example, an image scanner. It is also possible to draft pictures on the display of a computer by using various kinds of editors (software). FIG. 4(a) is an input continually-changing tone picture. The read picture is divided into a plurality of pixels. Each pixel is a minimum unit lining up lengthwise and breadthwise in a picture. Each pixel has individual tone information, and has only a single tone that is said by other expressions, e.g., density, degree of brightness, degree of darkness and so on. The degree of darkness is mostly similar to the density but is opposed to the degree of brightness. It is available to use one of them, but this paper adapts the expression of "tone" instead of density, brightness or darkness.

A region is defined to be a set of neighboring pixels having similar tones. Firstly, such regions are extracted. The entirety of a picture is divided into a plenty of regions. The number of divided regions varies by the width of tone resemblance. As the width of pixel tones of a region is larger, individual regions become wider and the number of regions becomes smaller. On the contrary, as the width of pixel tones of a region is narrower, the number of regions becomes larger, and individual regions become slimmer.

Figure 4B:
FIG. 4(b) is an average-tone image which has been made by dividing the original picture of FIG. 4(a) into the regions with similar tones and by painting each region with an average tone.
Figure 4C:
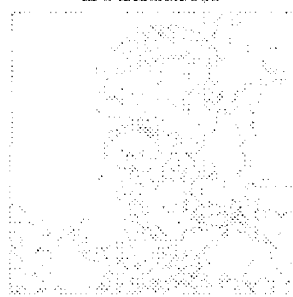
FIG. 4(c) is an assembly of boundaries which have been extracted from the region-divided image as boundaries between neighboring regions.
Figure 4D:
FIG. 4(d) is an assembly of branch points which have been extracted from the boundaries.
Figure 4E:
FIG. 4(e) is an assembly of turning points which have been extracted from the boundaries.
Figure 4F:
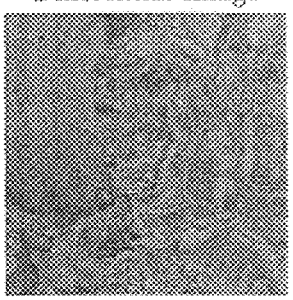
FIG. 4(f) is a differential image which has been produced by subtracting the average-tone image from the original picture.
Figure 4G:
FIG. 4(g) is a regenerated picture which has ben produced by adding a regenerated subtraction image and the regenerated average-tone image.

Average tones are calculated for all the regions. The average tone is defined as an average value of the tones of pixels of a region. The image including a plurality of regions painted with their average tones is called an "average-tone image". FIG. 4(b) is an average-tone image that is stored in the region memory device.

Since the entirety of a picture is divided into a plurality of regions, many boundaries appear as lines between neighboring regions. The region is an assembly of pixels, and the boundary is a assembly of lines running between neighboring pixels. The boundary is a line passing not the center of a pixel but the outline of a pixel unlike conventional image processing. Since a pixel is a minimum unit of a square, the lines around a pixel are either horizontal lines or perpendicular lines. Hence, a boundary is a continual line consisting of horizontal lines and vertical lines. The boundary is a line for characterizing a region. The boundaries are extracted for defining the outlines of the regions. Every boundary encloses a region, so that, is a closed loop.

But the boundary is not an isolated simple closed loop. Since more than two regions join with together, there occur many intersections at which three or four boundaries meet. Hence, there exist a lot of meeting points with other boundaries as tracing a boundary being a closed loop. The point at which three or more than three boundaries meet is called a "branch point". If a boundary is divided at branch points into partial boundaries, there exist only two regions on both sides of each partial boundary. It is feasible to retrieve a boundary and a region from an assembly of branch points and partial boundaries. The branch point, which is a point in which three or more than three boundaries intersect, is extracted.

The part of a boundary that is divided by two neighboring branch points on the boundary is called a "boundary interval". The boundary, a closed loop, is composed of a series of boundary intervals which are open curves terminated at branch points.

A "turning point" is introduced as another type of characteristic point. This turning point is defined as a point at which the boundary interval changes the direction discontinuously. The branch points and the turning points lie on the boundaries and characterize the boundaries, so that they are called "characteristic points". The boundary is divided into boundary intervals by branch points, and a boundary interval is further divided by turning points into partial lines that is called "subboundaries". Every subboundary divided by turning points and branch points is a curving or straight line having both ends. A boundary is a set of boundary intervals. A boundary interval is a set of subboundaries. If all coordinates of each point series on the subboundaries had to be memorized, it would be impossible to compress the data. Therefore, a pertinent contrivance is required further. A partial line, that is, subboundary is a smooth curved line having both end points and continuous differential coefficients at all the points except both ends.

Once the subboundary has been approximated by some functions, all the memories of the coordinates of the point series on the subboundaries can be abandoned. These approximation functions are represented by several parameters. The subboundary is defined and memorized by branch points, turning points and approximation functions instead of individual coordinates of point series on the subboundaries. The abandonment of individual coordinates of the point series on the subboundaries reduces the amount of data of the boundaries. This is the first step of the approximation processing of this invention. Such a one-dimensional processing is not enough in treating a continually-changing tone picture. Further, two-dimensional processing is required.

In the next step, the "differential tone image" is calculated as a difference image between the original picture and the average-tone image that has been stored in the region-memory device. The average-tone image consists of a plurality of regions painted with their own average tones. The subtraction between an original picture and an average-tone image is calculated at each pixel. Hence, since a subtraction=original pixel tone−average tone, the sum of differential tones is zero in each region and is also zero as the entirety of a picture. Since each region is defined to be a group of pixels whose differential tones are included in a certain range, the differential tones never go beyond the range. The resultant image of the subtraction is called a "differential (subtraction) image". There are only a single average tone picture and a single differential image picture in the process. The original picture, the average tone picture, and the differential image have the same full size. The original picture is made by adding the tones of the latter two. The average tone image is otherwise made by subtracting the differential image from the original picture.

Most of the continually-changing tones of the original picture are transferred to the average tones. The differential image contains weak fluctuation of tones on the other hand. The differential image includes only low-frequency components of tones that vary smoothly. Thus, the differential image is approximated by some pertinent functions. Since the differential image contains only smoothly varying tones, low order polynomials are sufficient to approximate the subtraction image. This is the second approximation, which differs from the former one. The second is the approximation of an amount of two-dimensional variation. Then the second compressed data are yielded by the function approximation of the differential image. Function approximation is carried out two times. The differential image is possible to be approximated as a whole, but the amount of data is so great that the differential image shall be divided into blocks. The differential image is, for example, divided into a plenty of blocks aligning lengthwise and breadthwise, and each divided differential block is approximated by pertinent similar functions. The approximation functions are reckoned for all the divided differential blocks.

The amount of data is outstandingly reduced by the approximation of boundaries and the approximation of the differential image. For example, when the quality of the original picture and the quality of the retrieved picture are assumed to be 30 dB (p-p/rms), the bit rate of the compressed data which signifies the amount of data is 1.98 [bit/pel] in the example. Since the original picture has been expressed with 8 [bit/pel], the amount of data is reduced to about 25%. This invention can transmit the compressed data to remote places via transmission mediums, e.g. telephone lines, exclusive lines, wirelesses and so on.

The data are transmitted from the transmitting side (port) to the receiving side (port) via various lines. The receiving side gets the data that have been compressed and encoded and stores the compressed encoded data in the memory device. When the differential image has been divided into blocks and each divided differential block has been approximated, the data of each divided differential image are transmitted in order, and are stored in order in the memory device on the receiving side. The data are stored in the memory device, so that it is possible to retrieve the picture not only simultaneous with the reception of the data but also at an arbitrary time after the reception of the data.

First, the differential image is regenerated from the compressed data at the receiving port. If the differential image is divided into blocks, divided differential blocks are regenerated and all of the differential blocks are synthesized to be a differential image as a whole.

Second, the boundaries are retrieved. Series of the boundaries retrieve the regions by enclosing them. Each region is painted with an average tone, which becomes an average-tone picture. A final picture corresponding to the original picture is regenerated by adding the differential image to the average-tone picture.

This invention is able to regenerate pictures not only in the original size at a constant position but also in an arbitrary scale at an arbitrary position. Since the information regarding the boundaries and continually-changing tones is converted into multivariable vector data, arbitrary enlargement and reduction are freely practiced at an arbitrary position by the calculation.

[Color Picture Case]

The above explanation is related to the processing of monochromatic continually-changing tone pictures. This invention also provides the processing of color pictures. In the case of a color picture, the color picture is resolved into several primary color continually-changing tone pictures, all the resolved continually-changing tone pictures are treated in parallel for every primary color by the same manner as a monochromatic continually-changing tone picture, and at last all continually-changing tone pictures are synthesized into a unified color picture. When a regenerative apparatus is a color display, a color picture shall be resolved into light primary colors RGB (Red, Green and Blue). When a printer is used as an output device, a color picture should be resolved into four primary colors, that is, CMYK (Cyan, Magenta, Yellow and Black).

[Binary Picture Case]

This invention aims at the processing of continually-changing tone pictures, which does not mean this invention can not treat binary pictures. Because a binary picture is considered as the simplest limit of a continually-changing tone picture. Therefore, this invention is capable of dealing with binary pictures. Such a binary picture is dealt with by the same manner as continually-changing tone pictures, but the treatment of a binary picture becomes far simpler than a continually-changing tone picture in manner.

The processing of a binary picture will be explained by referring to FIG. 5(a) to FIG. 5(g).

Figure 5A:
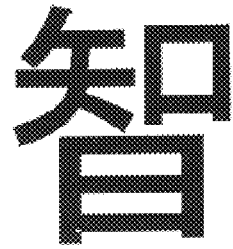
FIG. 5(a) is an original, starting picture of a Chinese character "智" in the Gothic font as an example of binary pictures.
Figure 5B:
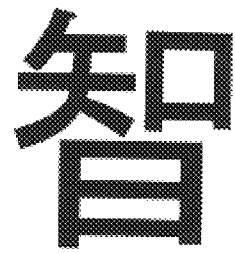
FIG. 5(b) is an average-tone image which has been produced by dividing the original picture of FIG. 5(a) into the regions with similar tones and painting each region with its average tone.

FIG. 5(a) to FIG. 5(g) exhibit the steps of processing an original binary picture, that is, a binary Chinese character of "智" printed in the Gothic front. Since this is a binary picture, the character part and the background part are constant in tone where the character part is painted black and the background part is blank (white). This binary picture is read-in by an image scanner in the same manner as the continually-changing tone pictures, and the read-in binary picture is memorized in the image memory device. FIG. 5(a) shows this read-in binary picture. This invention extracts the parts consisting of pixels having similar tones as continuous regions, and paints every region each average tone in order to make an average-tone image. This average-tone image is memorized in the region-memory device, which is shown by FIG. 5(b). Such the treatment is the same as the continually-changing tone pictures in manner. This invention can, however, much more simplify the treatment of binary pictures, which will be explained as follows.

Figure 5C:
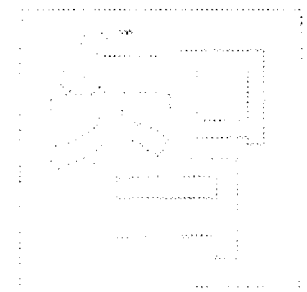
FIG. 5(c) is an assembly of boundaries which have been extracted from the region-divided image as boundaries between neighboring regions. In the case of binary picture, the boundaries are the same as the outlines of the character.
Figure 5D:
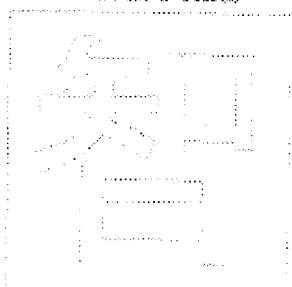
FIG. 5(d) is an assembly of the boundaries and branch points which were extracted from the boundaries. There is no branch point in the case of a binary picture.
Figure 5E:
FIG. 5(e) is an assembly of turning points which were extracted from the boundaries and are shown as black dots.

Since the object is now a simple binary picture, the regions are just equal to the character itself. FIG. 5(c) shows the boundaries which are outlines of the character. The average tone is equal to the character part tone. The average tone has only one value, that is, the average tone within the outlines is equal to the uniform tone of the black regions. The outlines of the character are extracted as boundaries that are closed loops. Hence, all the outlines are independent, isolated and separated from others and further have neither crossing point nor branching points. The boundaries inherit all the characteristics from the outlines. Therefore, the boundaries are independent closed loops and have no crossing, no branching and no contact, which brings about no points for dividing, the binary picture into more than two regions. FIG. 5(d) shows the result of extracting the branch points at which three or four different regions are in contact with each other. As known from FIG. 5(d), there are no branch points. There exist only turning points having discontinuous inclination and regular points having continual inclination. Therefore, it is sufficient to extract only the turning points. FIG. 5(e) shows the turning points. As explained hitherto, the binary pictures are simple in the processing of boundaries.

Figure 5F:
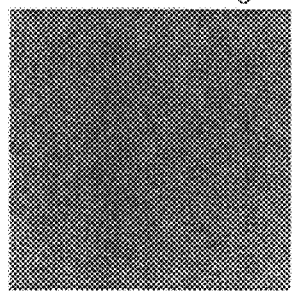
FIG. 5(f) is a differential image which has been produced by subtracting the average-tone image (FIG. 5(b)) from the original picture (FIG. 5(a)).
Figure 5G:
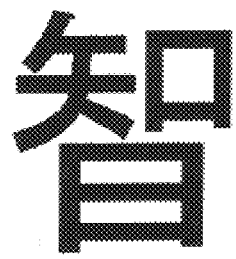
FIG. 5(g) is a revived picture which was produced by adding a regenerated subtraction image and the regenerated average-tone image.

The turning points are extracted, and the boundaries are divided into subboundaries (partial lines) by the turning points. The subboundaries are approximated by some pertinent functions. A differential tone image is made from the difference between the original picture and the average-tone image. Here, the processing becomes much simpler. The average-tone image is equal to the original picture. The differential tone image takes a constant tone value of zero, which is shown by FIG. 5(f). Here, the differential tone image is uniformly painted in gray so as to distinguish it from the background, but actually takes zero. The entirety of the differential tone image is zero in tone. The approximation functions denote a simple, monotone, flat plane, having constant coefficients.

In the case of binary pictures, there is no error in the approximation of tones. Thus the boundaries, i, e, outlines are the only elements of defining the binary pictures. For example, when the original picture was a binary Chinese character of "智", the bit rate was 0.22 [bit/pel]. Since the original picture was represented by 1 [bit/pel], the data were compressed to 22% by the function approximation.

These data, for example, turning points, approximation function coefficients of subboundaries, differential tone image and so on, are transmitted from the sending side to the receiving side via telephone lines, exclusive lines, electric waves and so on. The processing of binary pictures after receiving the data is the same as that of the continually-changing tone pictures. The receiving side retrieves the picture by calculating the differential tone image, the boundaries and the average-tone pictures. The regenerated picture is capable of being enlarged and reduced in size at an arbitrary position.

All devices of A to X shown by FIG. 3 will be explained in detail.

[A. IMAGE MEMORY DEVICE]

This is a device for dividing an original picture into pixels and for storing tones of all pixels. There are several methods of inputting the object picture, for example, drawings (including characters) written on a sheet of paper, photographs having continually changing monochromatic (or color) tones and so on. For example, the input picture is read by using an optical means. e.g. image scanner, digital cameras and so on, and the input picture data are stored by every pixel as digital information. In another means, the object picture is input into a computer as an image by using a mouse or a digitizer, and the input picture data are stored by pixels as digital information from the beginning. When the input picture is a continually-changing monochromatic tone picture, the input picture data are stored by the grades of tones of all the pixels.

When the input picture is a color one, the picture is resolved into four primary color images (or three primary color images). Every primary color image is a monochromatic continually-changing tone picture. The input picture is memorized by a two-dimensional function defined on the whole of the image. Coordinates of pixels are independent variables. Tones are subordinate variables. A pixel is expressed by its two-dimensional coordinates of $(x_i, y_j)$. x is the horizontal coordinate, y is the vertical coordinate, i is the number in the horizontal direction from the uppermost leftest one, and j is the number in the vertical direction from the uppermost leftest one. The tones are expressed by g. The tone of the i, j-th pixel is denoted by $g(x_i, y_j)$. The image memory device is a device for storing the tones g of all pixels as a two-dimensional function $g(x_i, y_j)$.

[B. REGION-DIVISION DEVICE]

This is a device for dividing an input picture into a plurality of regions which consist of an assembly of continuous pixels having similar tones. Hence, the input picture is divided into regions by the conditions that the tone difference within a region is smaller than a tolerance W, and the pixel tone difference between two pixels belonging to neighboring regions is larger than the tolerance. This region division has the following advantages.

1. To enhance the quality of picture, because a clear edge part having a steep tone changing becomes a boundary between two regions.
2. To reduce the amount of data because of allocating an average tone and differential tones to every region, which results in the reduction of bit number of approximation functions.
3. To shorten the time of processing because of the smoothness of the differential tone image which facilitates approximation.

The region-division device does not extract the outlines of real objects inherently existing in the picture but extracts a group of the pixels having similar tones as a region. This region-division device does not seek for intrinsic regions, but makes forcibly imaginary regions which do not exist inherently, and divides a picture into imagined regions. Thus the boundaries defined between the neighboring regions are not inherent outlines.

The processes for dividing a picture into imagined regions will be explained in order.

(Step 1) Initial Settlement

A region label "Label $(x_i, y_j)$" is allotted to every pixel $(x_i, y_j)$. Label $(x_i, y_j)$ is a binary function which takes either 0 or 1. "0" means that the pixel is not region-divided. "1" means that the pixel has already been region-divided. At the initial stage, the region label "0" is allotted to all pixels.

Label $(x_i, y_j) = 0$ (1)

(Step 2) Initial Operation

The pixels belonging to a region have individual tones. Three tones, that is, the maximum tone, the minimum tone and the average tone are defined to each region, and are denoted by $g_{max}$, $g_{min}$, and $g_{av}$, respectively. Since they are the parameters for each region, the region parameter (r) for denoting the numbers of each region should be suffixed like $g_{max}^{(r)}$. But the region parameter (r) is omitted here for simplicity. The average tone $g_{av}$ is not an arithmetic average of all the pixels in the region but an average of the maximum and the minimum, that is, $$g_{av} = (g_{max} + g_{min})/2. \quad (2)$$

The input image is scanned in the raster order, that is, from the leftest and uppermost pixel in the right direction every line for seeking out unlabeled pixels {Label $(x_i, y_j) = 0$}. When a 0-label pixel is found out, it is labeled {Label $(x_i, y_j) = 1$}. Firstly, $g_{max}$ and $g_{min}$ are equally determined to be the tone $g(x_i, y_j)$ of the first pixel. Thus, $$g_{max} \leftarrow g(x_i, y_j) \text{ and } g_{min} \leftarrow g(x_i, y_j)$$

The pixel $(x_i, y_j)$ existing on the leftest, uppermost position is allotted with Label $(x_i, y_j) = 1$, and both the maximum tone and the minimum tone of the region that contains only the pixel of i=0, j=0 are equal to the tone $g(x_i, y_j)$ of the first pixel $(x_i, y_j)$ (i=0, j=0)

$$\text{Label } (x_i, y_j) = 1, g_{max} = g_{min} = g(x_i, y_j). \quad (3)$$

This is the first operation before the raster scanning of a picture.

(Step 3) The Determination of Pixels Belonging to the Regions and Enlargement of the Regions A region consists of only single tone pixels at first. When the scanning starts, $g_{max}$ and $g_{min}$ are changing. But if the differences of tones are small, neighboring pixels are classified to the same region. Thus the region is gradually expanding. If the change of tone is beyond a constant range, the pixel cannot belong to the region. The enlargement operation of the region is stopped. Thus, the outline of the region is determined. A new region starts from the pixel. The region enlarges by unifying the proceeding pixels having similar tones.

The outstanding pixel is now denoted by $(x_i, y_j)$. The number of region the pixel belongs to is denoted by r. The maximum tone $g_{max}$, the minimum tone $g_{min}$ and the average tone $g_{av}$ of the outstanding region are known ($g_{max} \geq g_{av} \geq g_{min}$). The input picture is divided into a plurality of regions by adopting the concept of "eight-neighbors" which denotes eight adjacent pixels up and down, right and left, and oblique around the outstanding center pixel. Eight-neighboring pixels having neighboring tones are classified to the same region as the region of the center pixel. The continuity is guaranteed for the region by tracing the eight-neighbors which are up and down, right and left, and oblique around the outstanding pixel. Hence, the eight-neighbors of $(x_i, y_j)$ are written by $(x_i + \Delta_i, y_j + \Delta_j)$ where $\Delta_i$ and $\Delta_j$ are 0, -1 or +1 except $\Delta_i = \Delta_j = 0$.

The tones $g(x_i + \Delta_i, y_j + \Delta_j)$ of the pixels that are unlabeled but belong to the eight-neighbors of the outstanding pixel $(x_i, y_j)$ of the r-th region are compared with the average tone $g_{av}$ of the region. When the absolute value of the difference between the tone $g(x_i + \Delta_i, y_j + \Delta_j)$ and the average tone $g_{av}$ is smaller than an allowable width (tolerance ) W, $$|g_{av} - g(x_i + \Delta_i, y_j + \Delta_j)| < W \quad (4)$$

Namely, if the difference is smaller than W, the neighboring pixel is affiliated to the same r-th region. If the difference is larger than W, the neighboring pixel is judged as a member of a different region. Some of the eight neighbors are classified into the r-th region. The others are sorted to other regions. The assortment by Inequality (4) is very important for this invention.

Each tone $g(x_i + \Delta_i, y_j + \Delta_j)$ of the eight-neighbors belonging to the r-th region is further compared with the maximum tone $g_{max}$ and the minimum tone $g_{min}$ of the r-th region. If all the tones of eight-neighbors exist within the range from the maximum tone $g_{max}$ to minimum tone $g_{min}$, $g_{max}$ and $g_{min}$ are maintained as they are. If one neighbor tone $g(x_i + \Delta_i, y_j + \Delta_j)$ exceeds one of the limits, the exceeded limit is replaced by the exceeding tone $g(x_i + \Delta_i, y_j + \Delta_j)$ of the eight-neighbors. Hence, if $$g(x_i + \Delta_i, y_j + \Delta_j) < g_{min} \quad (5)$$

(if the tone of an eight-neighbor $(x_i + \Delta_i, y_j + \Delta_j)$ satisfies Inequality (5)), $g(x_i + \Delta_i, y_j + \Delta_j)$ replaces $g_{min}$, that is, $g_{min} \leftarrow g(x_i + \Delta_i, y_j + \Delta_j)$.

On the contrary, if $$g(x_i + \Delta_i, y_j + \Delta_j) > g_{max}, \quad (6)$$

(if the tone of an eight-neighbor $(x_i + \Delta_i, y_j + \Delta_j)$ satisfies Inequality (6)), $g(x_i + \Delta_i, y_j + \Delta_j)$ replaces $g_{max}$, that is, $g_{max} \leftarrow g(x_i + \Delta_i, y_j + \Delta_j)$. The replacement by Inequalities (5) and (6) expands the range from the maximum tone $g_{max}$ to the minimum tone $g_{min}$. However, unlimited expansion is not permitted. According to Inequality (4), the difference between $g_{max}$ and $g_{min}$ of a region is smaller than or equal to 2 W. Any pixel once judged as a pixel in the r-th region remains in the same region, satisfying Inequality (4) and intervening between $g_{max}$ and $g_{min}$.

(Step 4) Generation of the Next Region

The outstanding pixel is moved from $(x_i, y_j)$ to a neighboring pixel $(x_i + \Delta_i, y_j + \Delta_j)$ in the same r-th region, i.e. $(x_i, y_j) \leftarrow (x_i + \Delta_i, y_j + \Delta_j)$. And the operation of (STEP 3) is carried out for a new outstanding pixel. When there are new neighboring pixels satisfying Inequality (4), the neighbors are affiliated to the r-th region. The repetitions of (STEP 3) for the neighbors satisfying (4) make up a continual region (the r-th region) consisting of the pixels having similar tones. The r-th region includes only the pixels whose tone differences are less than 2 W. When there is no other neighboring pixel satisfying Inequality (4), the next (r+1)-th region shall newly be made. The pixel becomes a new outstanding pixel in the (r+1)-th region. (STEP 3) is repeated for the (r+1)-th region from the outstanding pixel.

Thus, regions are produced step by step in the raster order on the input image. A pixel allocated in a region is labelled with Label $(x_i, y_j) = 1$. When all the pixels are labelled with Label=1, the region-division ends. The total number of regions is denoted by "R", and the region numbers of r are shown by 0, 1, 2, ..., R-1. As a result, every pixel is allotted to any one of the regions.

The region-division of an original picture is carried out according to the repetitions of above STEPs from 1 to 4. The parameter W is a half of the common width of the allowable tones in a region. As the width parameter W is larger, there is a tendency to increase the regional data and the time for processing the regional data. As the width parameter W is smaller, the number of regions and the time for extracting regions are increased, and the picture approximation data and the time for approximating the data are reduced. The selection of W changes the mode of the region-division.

[C. REGION MEMORY DEVICE]

The region memory device stores the average-tone image which paints all the regions with their own average-tone. Regional numbers are allotted to each region for distinguishing from each other. The average-tone is, as mentioned before, g. which is a half of the sum of $g_{max}$ and $g_{min}$. Each region has a small image having only one tone. This is called "average-tone image", which is shown by FIG. 4(b) and FIG. 5(b) that revive characteristics inherent to the original picture. If the width parameter W is smaller, the average-tone image is approaching the original picture closer, and if W is larger, the average-tone image is farther deviating from the original picture. Here, the region memory device does not store boundaries of the regions but the average-tone image consisting of regions each of which is painted with its average-tone. The extraction of boundaries will be carried out by the next operation.

[D. BOUNDARY-EXTRACTION DEVICE]

The boundary-extraction device seeks boundaries that are curved lines generated between neighboring regions. Although the whole of the input picture has been divided into regions by the region-division device (B), these regions are not clearly defined by the boundaries. In this step, the boundaries must be clearly extracted as the lines between the neighboring regions, because the boundaries will be expressed by functions at a later step.

A convenient coordinate system is set up for expressing the boundaries. The coordinate has an origin (x, y)=(0, 0) at the uppermost, rightest point (not the pixel). X-coordinate (abscissa) horizontally expands from the origin to the right, and Y-coordinate (ordinate) vertically extends from the origin to the bottom. In this case, every position taking integer coordinate points is not a center of a pixel but a corner of a pixel. In general, all the conventional methods used to take the centers of pixels for integer coordinate points in their coordinate system. Unlike the prior methods, however, this invention takes integer coordinate points at the corners of pixels. Hence, every pixel is enclosed by four integer coordinate points. The center of a pixel is expressed by a set of half-integers. The coordinates (x, y) defined by the integers x and y are defined as the corners of pixels. "Points" mean corner points. This is the most important thing not only to express the boundaries exactly but also to practice the operation of enlarging or reducing a picture in size with accuracy. Therefore, the boundaries are the lines passing the peripheries of pixels, and never cross the pixels.

The regional boundaries are in discrete expressed as boundary point series (a series of corner points). Here, the boundary point series exist on the boundaries of regions, and are a set of coordinate points connecting with each other in four directions, that is, right and left and up and down. Since the integer coordinate points are defined as four corners of a pixel, four-neighboring linkage mode is natural. There exists no eight-neighboring linkage mode for boundaries unlike pixels. Symbol "R" denotes the total number of regions. The whole of the coordinate point series of boundaries is generally expressed by $\{x_k^r, y_k^r\}_{k=o}^{Nr-1}{}_{r=o}^{R-1}$, where N(r) shows the total number of boundary series points around the regional number of r, and k is the point number allotted to a boundary point on the boundary series. A boundary point is denoted by the region number r and the point number k which is different from the former expression in which the center of each pixel is denoted by the integer coordinates of $x_i$ and $y_j$. The point series around the r-th region are possible to be traced from k=0 to k=N(r) in order. Such an operation is carried out in all the regions r from 0 to R−1.

The boundary point series are sought by the following steps in practice.

(Step 1) Initial Adjustment r←0 (starting the processing of the 0-th region)

(Step 2) Extraction of Pixels of the R-Th Region

The pixels of the r-th region are extracted from the data stored in the region-memory device (C). This is a group of pixels that are spatially continuous, but each point is expressed by the coordinates which are allotted to the centers of pixels. The boundaries hereafter extracted from the data of the regions are shown by the coordinates defining at the corner points of pixels.

(Step 3) Tracing of the Boundary Point Series

An arbitrary point on the boundary point series of the 0-th region is found out, for example, by the raster scanning of pixels. The point is an initial point $(x_o^o, y_o^o)$. The point series are traced clockwise from initial point $(x_o^o, y_o^o)$ on the boundary around the 0-th region. The coordinate data on the boundary point series are extracted as an assembly of $\{x_k^o, y_k^o\}_{k=o}^{No}$. For example, the chain code method can be applied to the tracing of the boundary point series.

(Step 4) Judgement of the Finishing Condition

Boundaries are closed loops. Although a boundary may have branch points, any boundary is a closed loop running around some region. When a boundary is traced around a definite region, the tracer surely returns to the starting (initial) point on the boundary, that is, $\{x_k^r, y_k^r\}=\{x_o^r, y_o^r\}$. In this case, k is N(r). The point series on the boundary is entirely extracted by tracing the close loop clockwise around the r-th region. When the trace around the r-th region has ended, r is replaced by (r+1), that is, r←r+1. The points around the (r+1)-th region is traced in the same manner by going back to STEP 2. But when r=R, it is judged that the boundary point series for all regions have been extracted. Then the extraction of boundaries should be ended.

[E. BRANCH POINT EXTRACTION DEVICE]

The boundaries are all closed loops which are not separated from each other, but are in contact with each other. The boundary often has the points at which more than two boundaries meet. The point at which a plurality of boundaries bisect is called a "branch point". The boundary clearly differs from an outline of a binary image, because the outline has no branch. The branch points are one type of the characteristic points on the boundaries. The branch point is defined as a point having bisecting boundaries or having more than three regions in contact on a boundary. The branch point extraction device seeks the branch points on the boundaries.

The reason why the extraction of branch points is important will be explained.

If the branch point extraction were not done, it would be impossible to know which boundaries should be approximated in the later function approximation of boundaries after the boundary has been divided at a certain point. It is impossible to calculate without defining the range of function approximation clearly. Therefore, the branch points should be extracted. The approximation is carried out in a section terminated by two branch points.

The branch points are sought by scanning a (2×2) window (two pixels by two pixels) on the average-tone image stored in the region-memory device in the raster order from the left uppermost position to the right bottom position. Since a branch point is the point where more than two regions are neighboring, four pixels in the 2×2 window belong to three or four different regions when the center of the (2×2) window coincides with the branch point.

Such a point is judged to be a branch point. If a non-branch point is positioned at the center of the 2×2 window, four pixels in the window belong to two different regions. Such a 2×2 window having four pixels determines whether the central point of the window is a branch point or not. When the four pixels in the window belong to three or four different regions, the branch point extraction device extracts a point just positioned at the center (corresponding to the point positioned at the corners of enclosing pixels) of the window as a branch point.

[F. BOUNDARY-MEMORY DEVICE]

All the attributes of the boundaries are stored in the boundary-memory device by using branch point data according to the following steps. (STEP 1) Flags denoting branch points are allotted to the branch points on the boundary point series. (STEP 2) The partial boundary point series between two neighboring branch points is called a "boundary interval". The boundary interval is given a boundary interval number. When two neighboring regions commonly possess an interval, the boundary interval is numbered with the same number in both regions.

The boundary point series are suffixed and memorized as $\{X_k^p, Y_k^p\}_{k=o}^{M^{p-1}}{}_{p=o}^{P-1}$.. "P" is the total number of boundary intervals on the input image. Individual boundary intervals are denoted by a parameter "p" (p=0, 1, 2, 3, . . . , P−1). M(p) is the total number of serial points included in the p-th boundary interval. Serial points included in the p-th interval are numbered with "k" (k=0, 1, 2, 3, . . . , M(p)−1). Besides, $X_k^r$ is x-coordinate of the k-th point in the p-th boundary interval, and $y_k^r$ is y-coordinate of the k-th point in the p-th boundary interval. The aggregate of point series around the r-region is different from the aggregate of point series on the p-th boundary interval in the condition for defining the aggregates. Therefore, the coordinates of point series on the boundary intervals are expressed by capital letters X and Y.

[G. TURNING POINT EXTRACTION DEVICE]

The turning point is defined as a point on a boundary at which the gradient of the boundary changes drastically. In other words, the difference of gradient or the differential of gradient is sharply changed at the turning point. It does not mean that the gradient of a boundary is sharp. Such a turning point is one of the most important points for characterizing a boundary as well as the branch point. When a boundary is expressed by a function, such a turning point plays an important role. The necessity of extracting turning points will be explained briefly.

In general, the function approximation of a drastically-changing curve (tones in this case) requires high-order polynomials. It is, however, difficult to approximate a random varying curve by using high-order polynomials because of a lot of parameters and time for calculation. Even if the main portion of the curve can be approximated by high-order polynomials, the polynomials often invite strong parasitic vibrations away from the actual variation except the adjusting points like Runge's phenomenon. Such a trouble is caused by only one point at which the gradient is discontinuous. Any high-order polynomial is incompetent to depress the parasitic vibrations. The parasitic, undesirable vibration is a common difficulty appearing for any approximating functions in the case of approximating drastically-varying parts of a curve.

The approximation by low-order polynomials is allowable, if vehemently-changing parts are preliminarily excluded from the curve and other smooth-changing parts are reserved. Low-order functions are sufficient to approximate smooth-changing parts. Further, these low-order functions are immune from the vibrations. Therefore, the turning points should be preliminary excluded from the boundaries. The extraction of turning points should be done for excluding the turning points from the boundaries. It is possible to reduce the amount of data and to maintain the quality of picture because of the exclusion of turning points from the boundaries and the approximation of smoothly, continually-changing parts by low-order functions.

In the concrete, the turning points are sought according to the following steps on each boundary interval that has been divided by branch points.

(Step 1) Calculation of a Local Direction Vector

A local direction vector is a vector defined at every point of the boundary for representing the direction of a boundary. Here, the local direction vector is a vector drawn from a point preceding the current point by "a" unit lengths to the other point succeeding the current point by "a" unit lengths, where the unit length is a length of the side of a pixel. The local direction vector at the k-th point on p-th boundary interval, that is, $(X_k^p, Y_k^p)$ is defined as follows:

$$\text{Direction } (p, k) := \text{vector } (X_{k+a}^p - X_{k-a}^p, Y_{k+a}^p - Y_{k-a}^p). \quad (7)$$

Here, an important matter is not a length but a gradient. If the boundary is deemed as a continuous function, the local direction vector is able to be defined by a spatial differential or a tangential line of the continual function. The word of "local" means the direction of boundary that is changing in a small range near the outstanding point on the boundary. Since the parameter "a" is so small, the word of "local" is suitable. If "a" is large, the vector becomes non-local. The parameter "a" approximately ranges from 1 to 5. If "a" is smaller, the determination of the vectors becomes weaker for noise. Since the boundary has the four-nearest neighbor mode of connection, when "a"=1, the angles of the direction vectors take only eight values of 0°, 45°, 90°, 135°, 180°, 225°, 270° and 315°. A lot of apparent turning points appear.

On the contrary, if the parameter "a" is large, the direction vectors are insensitive to the change of the gradient of boundaries. In the following experiment, the parameter "a" is 2, that is, a=2, but it is desirable to determine the parameter "a" according to the objects.

(Step 2) Quantizing of Local Direction Vectors

STEP 2 quantizes the local direction vectors obtained in STEP 1. Here, the local direction vectors are quantized into eight directions different by 45 degrees. Quantization aims at stabilizing the local directional vectors to noise. Quantization has no influence on too short "a" (a=1). Too large "a" causes insensitivity to the local change of direction of the boundaries. For a short "a", for example, a=2 quantization, is effective in excluding noise. The quantized local direction vector is called a "directional vector", and is represented as Direction (p, k) where (p, k) shows the k-th point of the p-th boundary interval. Since there are eight directions for directional vectors, the angles inclining to the x-axis are only eight angles, that is, 0°, 45°, 90°, 13°, 180°, 225°, 270° and 315° .

(Step 3) Calculation of Local Turning Angles

The local turning angles θ (p, k) are reckoned at all series of points on all the boundary intervals. The local turning angle θ (p, k) on a point $(X_k^p, Y_k^p)$ of a boundary interval is defined as a direction difference between a direction vector preceding the current point by b unit lengths and another direction vector succeeding the current point by b unit lengths. Hence, the local turning angle is a direction change of the directional vectors in 2b unit lengths. The cosine of the local turning angle is defined by the inner product of the b-preceding vector and the b-succeeding vector.

$$\cos\theta(p, k) = \frac{|\text{Direction}(p, k-b) \cdot \text{Direction}(p, k+b)|}{|\text{Direction}(p, k-b)| \cdot |\text{Direction}(p, k+b)|} \quad (8)$$

The definition range of $\theta$ is $-\pi < \theta \leq \pi$.

Since the direction vectors have been quantized into eight directions, there are only eight angles, that is, $-135°$, $-90°$, $-45°$, $0°$, $45°$, $90°$, $135°$ and $180°$ for the local turning angles. Here, b is a parameter for controlling the locality in the determination of the turning of the boundary. If b is too large, it is impossible to detect local changes of the boundaries. If b is too small, the turning angle $\theta$ cannot reflect wide-range changes of the boundaries. It is necessary to determine a pertinent value of b.

(Step 4) Judgement of Turning Points

The local turning angle is considered as an angle made by two tangential lines that are drawn at one point preceding the current point by b and at the other point succeeding the current point by b. The object is taking out the points at which the boundaries are sharply curved. Then $\theta$ is compared with a parameter $\beta$, where $\theta$ is a localized turning angle, and $\beta$ is a critical parameter predetermined to be an angle between $-\pi$ and $+\pi$. If $\theta$ is larger than $\beta$, the point is a turning point. If $\theta$ is smaller than $\beta$, the point is not a turning point. Namely, a turning point satisfies the following inequality:

$$|\theta(p, k')| \geq \beta. \quad (9)$$

The turning points are shown by $(X_{k'p}, Y_k'^p)$. $\beta$ is a critical parameter for defining the turning points in the range from 0 to $2\pi$.

The boundaries that are closed loop lines have been divided by branch points into boundary intervals that are series of curves. Here, turning points are extracted by (8) and (9), and the boundary intervals are divided by the turning points. These are called "subboundaries". Hence, a series of continuous subboundaries is a boundary interval, and a series of continuous boundary intervals is a boundary. The subboundaries are definite curves having no characteristic points except the ends.

[H. BOUNDARY APPROXIMATION DEVICE]

The preceding processes have extracted boundaries, branch points and turning points on the boundaries. The boundaries have been divided into plurality of boundary intervals at the branch points, and the boundary intervals have been divided into boundary parts (that is, subboundaries) at the turning points. Here, the boundary approximation device (H) approximates the subboundaries by suitable functions. This invention practices function approximations twice. The first one is to approximate the subboundaries by suitable one-dimensional functions. The second is the two-dimensional one to approximate differential image, which will be explained in detail later. Since the boundaries have been divided into boundary intervals by the branch points, the boundary intervals have no more branch. Further, since the boundary intervals have been divided into subboundaries by the turning points, the subboundaries have no more turning point having a big change of curvature. Therefore, there is no vibration in the approximation functions of the subboundaries.

The points on a subboundary are denoted by two parameters, e.g. the number of a subboundary and the number k of a point in the subboundary. For avoiding complexity of suffixes, the k-th point is denoted as $(X_k, Y_k)$ only by the point number k without showing the subboundary number. Subboundary point series are represented by a set $\{(X_k, Y_k)\}$. It may be possible to approximate Y as a function of X. But since curves Y(X) on two-dimensional plane (X, Y) generally become multivalued functions of X, it is inconvenient to treat Y as a function of independent X.

A set of point series on a boundary is, therefore, represented by two independent single valued functions $\{(t_k, x_k)\}$ $\{(t_k, y_k)\}$. Here, t is an intermediate, independent variable, which enables to separate x-coordinates from y-coordinates and to treat X(t), Y(t) as single-valued functions. However, there remains some arbitrariness among t, x and y. As mentioned before, the boundary of this invention is a series tracing one of four neighboring points which are positioned at four corners of a pixel. Since the boundary points are defined at four corners of pixels, the distance between neighboring points is always 1 in a unit length of a side of a pixel. Therefore, t increases by 1 per one side. Since every distance between neighboring points is 1, the arbitrariness of intermediate variable "t" vanishes.

A set of point series of $(x_k, y_k)$ represented by the intermediate variable "t" is approximated by single-variable periodic spline functions with uniform intervals. Any order of spline is available, but the third or second order spline is easy to treat. High order splines would consume a lot of time for calculating and a great amount of memory data because of many coefficients. If the first order spline function were to be used, a boundary would become a straight line. Thus, it is impossible to approximate a smooth curve. The second order is the lowest of the available splines. More than the second order are certainly available, but almost all boundaries are able to be approximated by the second order spline function. Here, since subboundaries are smoothly curved parts, that is, subboundaries exclude turning points. Subboundaries are easy to be expanded by low order spline functions of division number "n".

$$S_x(t) = \sum_{l=-2}^{n-1} c_{xl} N_l(t). \quad (10)$$

$$S_y(t) = \sum_{l=-2}^{n-1} c_{yl} N_l(t). \quad (11)$$

The subboundary is divided into n pieces having a common length. Piece number "n" is called a division number. Here, 1 takes (n+2) values from $-2$ to (n-1). $N_l(t)$ is a normalized spline base function, and l is the number of base. Then, $c_{xl}$ and $c_{yl}$ are coefficients of $N_l(t)$ in the linear expansions. The subboundary is divided into n pieces. There are (n+1) nodes distributing with a common interval. An interval is a piece. $N_l(t)$ is a spline base having a peak at the (l+1)-th piece. For example, the m-th order spline base $N_l(t)$ has finite values only at (m+1) pieces but zero at other pieces. The spline base $N_l(t)$ is (m−1) times differentiable at m nodes. If the 2nd order spline is used (m=2), $N_l(t)$ has finite values only at three pieces, e.g. l, (l+1) and (l+2), but is zero at other pieces 0, 1, ..., (l−1), (l+3), ..., n. It is said that the subboundaries are expanded in the space spanned by (n+2) bases.

The 2nd order spline is the simplest polynomial. For the sake of simplicity, the piece length $\Delta$ is taken as $\Delta=1$.

The base $N_o(t)$ can be represented by simple quadratic polynomials;

$N_o(t) = 0.5\ t^2 \ (0 \leq t < 1)$
$N_o(t) = -1.5 + 3\ t - t^2 \ (1 \leq t < 2)$
$N_o(t) = 4.5 - 3\ t + 0.5\ t^2 \ (2 \leq t < 3)$ Since $N_p(t) = N_o(t-p)$, all of functions are determined by displacement of the fundamental base function. It is a very simple way.

Since the subboundary is equally divided into n pieces of a common length (interval) by (n+1) nodes, the function bases allow parallel displacement. Then $N_p(t)=N_o(t-p\,\Delta/n)$ is established, where $\Delta$ is the whole length of a subboundary, and n is the total number of pieces (division number). Hence, $\Delta/n$ shows one piece. When $N_o(t)$ is moved in the right direction in parallel by p pieces, the function base becomes $N_p(t)$. $c_{xl}$ is a coefficient of the base $N_l(t)$. Reckoning the coefficients $\{c_{xl}, c_{yl}\}$ results in the determination of the spline function expansion.

The spline function is a piecewise polynomial that is different from general polynomials. Therefore, the spline function has the benefit of suppressing useless vibrations in the part where the change of the original function drastically changes. The subboundary $\Delta$ is divided into a plurality of pieces, and each piece is given a different polynomial. The node is a joint point of two neighboring pieces. The m-th order spline function is (m−1) times differentiable at the nodes. In the 2nd order spline base, the original function itself and the 1st order differential are continual. But the 2nd order differential is discontinuous at nodes. Otherwise, it is possible to put nodes at appropriate spots as a set of parameters according to the purpose. If so, it would increase the additional calculation for determining the piece point.

To avoid the node calculation, this invention firstly gives nodes on the subboundary. How to give nodes will be explained. The nodes are the points at which a subboundary is divided into pieces. Hence, the whole length of a subboundary is divided into n pieces which have an equal length of 1/n. Hence, there are (n+1) nodes having an equal interval, which does without the calculation of determining nodes. The piece number n is a new parameter for defining the degree of approximation. Hence, an increase of the piece number n and the sorts of functions raises the accuracy of approximation.

All the points of a subboundary are allotted with some values of "t" that is an intermediate, independent variable. X-coordinate of the subboundary is shown by the continuous function of $s_x(t)$, and y-coordinate of the subboundary is shown by $s_y(t)$, where $s_x(t)$ and $s_y(t)$ are quadratic spline bases. The actual coordinates of the k-th point of the subboundary are $(x_k, y_k)$ The coordinates of $(x_k, y_k)$ are approximated by $s_x(t_k)$ and $s_y(t_k)$ respectively. The difference between $(x_k, y_k)$ and $(s_x(t_k), s_y(t_k))$ is given by adding the square of $(x_k-s_x(t_k))$ to the square of $(y_k-s_y(t_k))$. The sum of the square of the differences at all the points is denoted by a square error "Q". It is obtained by adding square differences of k from 1 to M(p).

$$Q = \sum_{k=0}^{M_p-1} \{s_x(t_k) - x_k\}^2 + \sum_{k=0}^{M_p-1} \{s_y(t_k) - y_k\}^2. \quad (12)$$

Here, $\Sigma_k$ means the sum of the values from 1 to M(p) on the current subboundary. The approximation functions of $s_x(t)$ and $s_y(t)$ are determined as the square error of Q is minimized. Since the spline functions are piecewise polynomials, preferable coefficients in $s_x(t)$ and $s_y(t)$ are determined by minimizing "Q". There are two methods of seeking optimum coefficients. One way is the "least square error method (A)" and the other is the "biorthonormal function method (B)". The second method (B) has been proposed by this Inventor for the first time. Both methods will be explained in detail. After the determination of the coefficients for minimizing "Q" to a certain division number of M (n=M), the precision of these approximations is evaluated.

The approximation precision is evaluated by examining whether the distances between actual points and approximated points are kept within a tolerance $\eta$ at all the points. Since such evaluation is done by calculating the root of the square error between $(x_k, y_k)$ and $(s_x(t_k), s_y(t_k))$ at every point of "k", comparing the square error with a predetermined tolerance $\eta$ and examining whether all the roots of square errors at all points are smaller than the tolerance $\eta$. Therefore, the maximum of the roots of the square errors among all "k" is denoted by $\epsilon$, which is defined by the following equation.

$$\varepsilon = \max_k [\{s_x(t_k) - x_k\}^2 + \{s_y(t_k) - y_k\}^2]^{1/2}. \quad (13)$$

Here, max, means the maximum among the points of "k" from 0 to M(p)−1 on the p-th subboundary. Q of Eq.(12) shows a sum of the squares of differences between $(x_k, y_k)$ and $(s_x(t_k), s_y(t_k))$ and gives the principle of determining the coefficients by the least square error method. On the contrary, $\epsilon$ of Eq.(13) works for evaluating the validity of coefficients by the errors at individual points on the subboundary.

The tolerance for evaluation is $\eta$. If $\epsilon$ is larger than $\eta$, a similar calculation is once more repeated by increasing the division number from n to (n+1) in order to seek another spline function approximation minimizing Q. The maximum $\epsilon$ of the roots of square errors is calculated again, and is compared with the tolerance $\eta$. If $\epsilon$ is still larger than the tolerance $\eta$, a further similar calculation should be repeated by increasing the division number from (n+1) to (n+2). The inequality $\eta>\epsilon$ will be surely established by increasing the division number of n by 1. When $\eta>\epsilon$ is obtained, the approximation is stopped, and at the same time the coefficients of the spline functions are determined. The coefficients of the approximation function are adopted for showing the p-th subboundary. Two methods, that is, the least square error method (A) and the biorthonormal function method (B) will be explained hitherto, which determines the spline function approximation minimizing Q for a given division number of n.

[Least Square Error Method (A)]

Q of Equation (12) is partial-differentiated by $\{c_{x1}\}$ and $\{c_{yl}\}$. And the partial-differentiated values should be equal to zero. When the square error Q is minimized for a set of coefficients, Q is never increased by small changes of coefficients. Hence, it is possible to determine the coefficients of $\{c_{xl}, c_{yl}\}$ of the spline function by $dQ/dc_{x1}=0$ and $dQ/dc_{yl}=0$. The principle is simple, but the calculation is complex. The square error of Q contains the sum of 2(n+1) base coefficients, and there are 2(n+1) differentials. The bases are represented by two matrix equations of (n+1)−columns×(n+1) lines. To solve these matrixes, two inverse matrixes of (n+1) columns×(n+1) lines must be calculated.

$$\sum_k \sum_l c_{xl} N_l(t_k) N_p(t_k) = \sum_k x_k N_p(t_k). \quad (14)$$

$$\sum_k \sum_l c_{yl} N_l(t_k) N_q(t_k) = \sum_k y_k N_q(t_k). \quad (15)$$

Solving the above matrix equations is not easy except for the case in which the division numbers n and the boundary point series numbers are small. The boundary point series numbers are, however, not always small. The division numbers n start from a small value at the beginning, but similar matrix calculations should be repeated by increasing the division number n one by one till satisfactory approximation is obtained. The increment of the division number n requires a greater amount of calculation and much more time for calculating the matrixes. Therefore, calculations of the above matrix equations are not always possible. This least square error method (A) has the advantage that every person is able to understand its principle easily, but is incompetent for large division number n. This method is not effective because of the calculation of a great size of matrixes. The great increment of the division number n will make the processing impossible through an abrupt increase of calculation time.

[B. Biorthonormal Function Method]

Biorthonormal function has been firstly contrived by this Inventor himself. This method easily overcomes the problems annoying the least square error method, that is, long calculation time for a big division number n. This new method is superior to the least square error method.

Almost all special indefinite function series have eigen functions of $\{\phi_n(t)\}$ which are reciprocally orthonormal. The concept of orthonormality is commonplace for conventional function series. The orthogonality means that the integration of a product of two functions with different parameters in a certain integration range is always zero. These orthonormal function groups are briefly shown by $(\phi_m \cdot \phi_k) = \delta_{mk} \cdot (\cdot)$ means an inner product which is an integration by the independent variable. $\delta_{mk}$ is Kronecker's $\delta$ which is zero when $m \neq k$ but is 1 when $m=k$. These base functions $\phi_m$ and $\phi_k$ have influential oscillation parts at both ends. The functions of different parameters have different modes of oscillation. The integration of the product of different parameter functions is always zero, because the different oscillation modes cancel with each other in the product.

Spline function bases are exceptional. Spline base functions are so simple polynomials with little oscillation that there is no orthonormality between different parameter bases. Hence, the assembly of the spline functions is a non-orthonormal function system. Non-orthonormality brings about serious difficulty to spline functions. It is difficult to seek for the coefficients of $c_k$ because of the non-orthonormality. An elaborate calculation should be done for determining the coefficients on spline bases. If function bases have the orthonormality like conventional orthonormal function series, the coefficients of $c_m$ is easily given by the inner product of $c_m = (g \cdot \phi_m)$ when $g = \Sigma c_m \phi_m$ is given by expanding an arbitrary function of g with a set of function series $\{\phi_m\}$.

It is difficult for spline functions to have the orthonormality because of their simplicity. Biorthonormal functions are made for giving the spline functions quasi-orthonormality. The concept of biorthonormality has been known. But nobody but this Inventor has found out a method of calculating biorthonormal functions of spline functions directly. Then biorthonormal functions had poor significance for determining the coefficients on spline bases. However, this Inventor has discovered a new way to calculate biorthonormal functions of spline bases for the first time. The biorthonormal approach gains significance.

When an arbitrary function g(t) is expanded into a linear combination of spline bases $\{N_p(t)\}$, the coefficients $\{c_p\}$ can be calculated by a simple integration of a product $g(t)\{L_q(t)\}$ of g(t) and the biorthonormal function $L_q(t)$. When $g(t)=\Sigma c_p N_p(t)$, the coefficients $\{c_p\}$ are briefly given by the Equation of $c_p=(g \cdot L_p)$. $\{L_p\}$ is biorthonormal to $\{N_p\}$. $\{L_p\}$ has no orthonormality itself like $\{N_p\}$. There is, however, quasi-orthonormality between $N_p$ and $L_q$. Hence, $(L_p \cdot N_q) = \delta_{pq}$. The quasi-orthonormality is reciprocal. When $\{L_p\}$ is quasi-orthonormal to $\{N_p\}$, $\{N_p\}$ is quasi-orthonormal to $\{L_p\}$.

The quasi-orthonormality is named biorthonormal. The coefficients of $c_{xp}$ and $c_{yp}$ are easily calculated by using the this artificial function $\{L_q(t)\}$ that is called a "biorthonormal function" of $N_q(t)$.

Subboundary points $(s_x(t), s_y(t))$ are expanded in spline bases $\{N_p(t)\}$ and $\{N_q(t)\}$.

$$S_x(t) = \Sigma c_{xp} N_p(t). \tag{16}$$

$$S_y(t) = \Sigma c_{yq} N_q(t). \tag{17}$$

Therefore, biorthonormal functions $\{L_p\}$ $\{L_q\}$ give formal expressions of $c_{xp}$ and $c_{yq}$.

$$c_{xp} = (s_x(t) \cdot L_p(t)). \tag{18}$$

$$c_{yq} = (s_y(t) \cdot L_q(t)) \tag{19}$$

The inner product is here adopted for simplifying the expression of integration. The range of integration is equivalent to the entire length of subboundaries, but it is impossible to calculate, because the continual functions, e.g. $s_x(t)$ and $s_y(t)$, have been unknown yet. The k-th point coordinates $(x_k, y_k)$ on a subboundary are known. Therefore, the above calculation is done by substituting $x_k$ and $y_k$ for $s_x(t)$ and $s_y(t)$. Hence, $$c_{xp} = \sum_k x_k L_p(t_k) \tag{20}$$

$$c_{yp} = \sum_k y_k L_p(t_k). \tag{21}$$

The integration by t is also replaced by the summation about k. The precision of the approximation is estimated by the same way that has already been clarified for the least square error method. The maximum of errors (distances between $(s_x(t), s_y(t))$ and $(x_k, y_k)$) is denoted by $$\varepsilon = \max_k \{(s_x(t_k) - x_k)^2 + (s_y(t_k) - y_k)^2\}^{1/2}. \tag{22}$$

If $\varepsilon < \eta$ (tolerance), the approximation finishes. But if $\varepsilon > \eta$, the approximation is repeated by increasing the division number n to (n+1) till all the distance between the original points $(x_k, y_k)$ and the approximation points $(s_x(t_k), s_x(t_k))$ becomes smaller than a predetermined critical value ($\varepsilon < \eta$). An embodiment takes $\eta = 0.5$. If the inequality $\varepsilon < 0.5$ is satisfied, the approximation shall be ended and the current coefficients $\{c_{xq}\}$ and $\{c_{yq}\}$ shall be adopted as the final coefficients.

The biorthonormal function $L_l(t)$ is given directly by $$L_l(t) = \sum_{k=0} \left[ h^2 \int \frac{\exp(2j\pi f(k-1)h)}{\sum_{p=0}^{6} \frac{\sin\pi(fh-p)^6}{\{\pi(fh-p)\}^6}} df \right] N_k(t). \tag{23}$$

The above Equation has been disclosed in Inventor's doctoral dissertation, that is, Takahiko Horiuchi; "A study of adaptable system model and its application to desktop publishing system" Dissertation, University of Tsukuba, 1995.

The biorthonormal functions are capable of calculating from Eq.(23). It is convenient to make a table of the values of biorthonormal function groups as a function of t regarding the division number n, and to memorize the table. It takes much time to calculate the biorthonormal functions every time, but the inner product can be easily calculated by reading in the biorthonormal function from the memory table. When $L_q$ is biorthonormal to $N_q$, $N_q$ is biorthonormal to $L_q$. Therefore, they seem to have symmetry with each other, but it is wrong. $N_q$ is an extremely simple polynomial with little oscillation. $L_q$ which is orthogonal to $N_q$ is a complicated function having strong oscillation. $L_q$ has definite values in the range (three pieces) from t=q to t=q+3 as well as $N_q$. Both $L_q$ and $N_q$ are zero except the range between t=q and t=q+3.

$L_p$ is able to be calculated not only from the above Equation but also be calculated from the relationship between $N_p$ and $L_p$ shown by the following Equations.

$$(N_p \cdot L_p)=1. \quad (24)$$

$$(N_{p-1} \cdot L_p)=0. \quad (25)$$

$$(N_{p+1} \cdot L_p)=0. \quad (26)$$

$L_p$ can be calculated from the above relations, since $N_p$, $N_{p-1}$ and $N_{p+1}$ are known functions. It may be a good way to make a table of $\{L_p\}$ as a function of t for every division number n. Parameters p (p=-2, -1, . . . , n-1) seems to require a lot of function values of $\{L_p\}$, but it is wrong. $L_p$ has the parallel displacement symmetry, that is, $L_p(t)=L_{p-s}(t-s)$. Only one set of function values is enough for calculation. Then, the subboundaries are approximated by linear combination of the functions $\{N_p(t)\}$. [I. REGION DATA MEMORY DEVICE]

The region data have been obtained by the steps of: memorizing an original picture in the image memory device, extracting regions consisting of the pixels with a similar tone, obtaining average tones in every region, seeking for boundaries between regions, abstracting the characteristic points, i.e. branch points and turning points, expressing subboundaries between the branch points or the turning points by a linear combination of spline bases with coefficients and determining the coefficients of the linear combination of the spline expansion. The region data memory device (I) stores many following attributes as the region data;

1. Size of an input picture
2. Number of regions
3. Average tones of each region
4. Boundary information
5. Number of subboundaries
6. Starting points and division number of the subboundaries
7. Coefficients in the liner combination expansion by the spline base functions Table 1 shows the numbers of these data. The size of an input picture is the horizontal length and the vertical length of the original picture. The size data consume 4 bytes of the memory. It is necessary to distinguish the original picture from the background when the original picture is divided or is reproduced. Therefore, the size of the original picture is necessary. The number of regions depends on the substance of the input picture and the tolerance 2W of tones. The region number needs 2 bytes of the memory.

When the number of regions is denoted by $K_1$, there are $K_1$ average tones. These average tones are necessary for the image regeneration. The average tones require $K_1$ bytes of the memory. The boundary information contains two kinds of parameters, one is the number of the boundaries enclosing the current regions, and the other is the directions (positive/negative) of tracing the boundary point series around the regions. Here, the direction of tracing boundary point series determines which side of the boundary the corresponding region exists on. The boundaries have regions on both sides. If there is no boundary direction information, it is impossible to know which side of the retrieved boundary the outstanding region exists on. For example, a boundary should be predetermined to take clockwise rotation around the region as positive direction. The direction teaches which side of the boundary has the corresponding region. The boundary information occupies 4 $K_1$ bytes in the memory.

TABLE 1

SIZES OF REGION DATA

| NATURE OF INFORMATION | | DATA SIZE |
|---|---|---|
| Original Picture Information | Size | 4 bytes |
| Region Information | Number of Region | 2 bytes |
| | Average Tone | $K_1$ bytes |
| | Boundary Information | 4 $K_1$ bytes |
| Boundary Information | Number of subboundary | 4 bytes |
| | Starting Point & Division Number | 8 $K_2$ bytes |
| | Coefficients | $\sum_{k=0}^{k2-1} \{n_x^{k2} + n_y^{k2}\}$ bytes |

Both ends (starting point and end point) of a subboundary are turning points or branch points. The starting point of a subboundary is just the end point of a preceding subboundary. Only the starting points are memorized in the region data memory device. The end points are also known from the same data. $K_2$ is the total number of subboundaries. Since the total number of regions $K_1$ and the number of boundaries $K_2$ are independent parameters, both should be memorized. The starting point has two coordinates of x and y for 4 bytes, and the division number has two directions of x and y for 4 bytes, so that 8 bytes are needed for one subboundary. Thus subboundaries consume $8K_2$ bytes. "$k_2$" is the boundary number. $n_x^{k2}$ means the number of approximation coefficients of $s_x$ which is the x-component of the $k_2$-th subboundary. $n_y^{k2}$ is the number of coefficients in $S_y(t)$. The $k_2$-th subboundary has $(n_x^{k2}+n_y^{k2})$ coefficients in $S_x(t)$ and $S_y(t)$. Thus total number of coefficients is $\Sigma(n_x^{k2}+n_y^{k2})$.

[J. DIFFERENTIAL IMAGE PRODUCTION DEVICE]

The differential image is defined as an image made by subtracting the average tone image from the original, input image. The word "differential" is generally used for differential calculus, and is sometimes identified with step by step variations, that is, step differences. Hence, the differential in general means a difference between two substances having the same quality. But the differential used by this invention means a difference between the original image tone and the average image tone which do not have the same quality.

Differential image is the most important concept in this invention. In this invention, the necessity of calculation of difference of two different images is surely expected at the step of making the average-tone image. The average-tone image is an assembly of the regions which allocate all their pixels with their own common tones. Delicate tone variations are ignored in the average tone image. But they are important. As mentioned above the differential image is defined as an image made by subtracting the average-tone image from the original image. Good quality of retrieved picture can be accomplished only by approximating this differential image as faithful as possible.

When a pixel $(x_i, y_j)$ in a region k has an original tone $g(x_i, y_j)$, and the region containing the pixel has an average tone of $h(x_i, y_j)$, the differential tone $\text{diff}(x_i, y_j)$ is defined on all the pixels in the region k by the following equation.

$$\text{diff}(x_i, y_j) = g(x_i, y_j) - h(x_i, y_j). \tag{27}$$

The average of $g(x_i, y_j)$ in every region is h, and the parameter for denoting h should naturally be the number k of region. Although the average tone h is a common value in a region, the average tone h is also assigned by $h(x_i, y_j)$ to all the individual pixels $(x_i, y_j)$ belonging to the region (r). The average of g is h. The sum of the differential tones $\text{diff}(x_i, y_j)$ in the pixels belonging to the region (r) becomes zero. Since the pixels having a difference between their tones and the average tone less than W belong to the region, the absolute value of the $\text{diff}(x_i, y_j)$ between g and h is less than W. W is rather small. Thus, the difference between g and h is small in the region, and the average of g is h.

In other words, the diff is in the range from −W to W, and the average of diff is zero. Hence, the differential image is far more monotonous, smoother than the original image. The differential tones range between −W and W in every region, and the average is zero. The original picture is fully covered with a plurality of regions, so that the differential tones are contained in the narrow range between −W and W in the whole of the picture and the average of differential tones is zero in the whole.

Now, the equation of diff=g−h defined within regions should be deemed to be a general equation for defining a differential image all over the whole picture. Here, the image painted by differential tones is called a differential image. Hence, the differential image is defined as the whole of a picture without being restricted by regions. Thus, the differential image has a small fluctuation of tones, which brings about a monotonous and smooth image. Fluctuation of tones is absorbed in the average tone image.

There is, however, the problem of boundaries. Tone should be a continual function, and is also continual in the direction crossing the boundaries which divide the picture into a plurality of regions. Neighboring regions have different average tones. Since the differential tone is made by subtracting an average tone from an original image tone, the differential tone in the boundary is not continual by the difference between the average tones of neighboring regions. Hence, the differential tones are discontinuous in the directions crossing the boundaries. Is this obstacle to the approximation and reproduction? This seems to be a cause for worry. In the case of an image having a smooth, continual change of tones, the difference between the average tones of neighboring regions is so small that the discontinuity across the boundaries would be also small. But in the case of a picture having a large discontinuity across the boundaries such as a binary picture, it may be anxious about a large discontinuity appearing in the parts corresponding to the boundaries.

But such anxiety is unnecessary. There occurs no discontinuity in the boundaries, because coordinate points are taken at the centers of pixels in the case of treating tones. But when the boundary is treated, coordinate points are taken at corners of pixels. Since the case of treating boundaries differs from the case of treating tones in taking coordinate points, the gaps of tones are absorbed in the boundaries. The pixels positioned at the periphery of each region exist inside of the boundaries and their tones are equivalent to the tones of each region. Therefore, there is no discontinuity across the boundaries in the differential tone image. This invention is able to erase such discontinuity across the boundaries of the differential image that would appear in a binary picture.

[K. DIFFERENTIAL IMAGE MEMORY DEVICE]

The differential image memory device stores the differential image, e.g. $\text{diff}(x_i, y_j)$. The differential image is stored in the differential image memory device not region by region but as the whole of one picture. The average tone image has been stored in the region data memory device. An original picture can be restored by adding the differential image stored in the differential image memory device to the average tone image stored in the region data memory device.

[L. DIFFERENTIAL IMAGE DIVISION DEVICE]

A further contrivance is proposed here for reducing the time and the data for approximating the differential image. The picture has been divided into regions having mostly similar tones, and the differences between the original image tones and the average tones have been calculated in each region till now. It may be natural to approximate the tone variation of differential images in the unit of regions. The approximation on the regions may be a natural way from the idea in which the picture is divided into a plurality of regions. It may be perhaps a possible alternate.

This inventor, however, does not adopt such the way. The divided regions have a great variety of shapes and sizes. The shapes are irregular in the regions. The sizes are entirely random. The boundaries are curved. Even if boundary conditions were given, the conditions themselves would be very complicated. The boundaries are so complicated that even two-dimensional functions would not easily be calculated under the boundary conditions.

It seems wasteful not to use the divided regions for the differential image approximation. But this invention uses the differential image as a whole without adopting the divided irregular-shaped regions. The tone variation in the whole differential image is so small that it is possible to approximated by low-order functions. Four borders form regular rectangles, so that they allow simple boundary conditions. It is of course feasible to approximate the tone variation to a sheet of the differential image by two-dimensional functions at a stretch. When the computer is capable of memorizing a great amount of data, the whole of differential image should be approximated at a stroke.

When the computer is incapable of storing a large amount of data, the whole of differential image cannot be approximated at a stretch. In this case, the differential image is divided into a plurality of partial images which have a suitable, constant area. These partial images are rectangles having the same sizes, which are called "blocks". The differential tones are approximated by two-dimensional functions block by block. Since each small block is approximated by two-dimensional functions, the processing time is substantially reduced.

If a general picture having a lot of tone variations were divided into blocks, there would occur "block distortion" at the borders of blocks. But in this invention, the parts having intense tone variations in the original picture have been absorbed into the average tone image, and the differential image has a smooth tone variation. Basically, there are small changes of tones in the differential image. Therefore, the block distortion hardly occurs at the borders, even if the differential image is divided into a plurality of blocks. This is one of the superb features of the present invention.

This invention, however, can be carried out without dividing the differential image into blocks. The division into a plurality of blocks is a contrivance for shortening the time of calculation and for saving the memory. Therefore, when the curtailment of time is less important, the differential image can be directly approximated by two-dimensional functions without dividing into blocks. If the differential image is divided into blocks on sending sides, the differential image must be regenerated block by block and must be synthesized into one picture on receiving sides. Even if the division and synthesis increase the processing time, the time of processing is curtailed by the block division as a whole.

[M. DIFFERENTIAL BLOCK MEMORY DEVICE]

The differential tones $\{diff(x_i^q, y_j^q)\}Q$ are stored block by block in the differential block memory device, where q is the number of a block, and Q is the total division number of blocks. $(x_i^q, y_j^q)$ means the coordinate of the i-th pixel in the q-th block. The $diff(x_i^q, y_j^q)$ is the differential tone of the i-th pixel in the q-th block.

[N. DATA APPROXIMATION DEVICE]

This is the second approximation in this invention. The first one is the approximation of boundaries by one variable spline functions. The second is the approximation of tones of the differential image, where the tones are given by the function of two variables, e.g. x and y. Thus the differential image shall be approximated by two-variable functions. Here, quadratic spline functions are used as bases. Of course, cubic splines are also allowable. $S(x_i, y_j)$ is an approximation function of the differential image $\{diff(x_i, y_j)\}$. The differential block is expanded on the two-variable quadratic B-spline bases of uniform nodes $\{\Psi_{mn}\}$. The uniform nodes mean that nodes are distributed uniformly with a common interval on a subboundary, as explained before. This function includes independent variables of x and y, but is a simple product of the spline function in x-direction by the spline function in y-direction.

The spline base $\Psi_{mn}(x, y)$ is given by the following equation.

$$\Psi_{mn}(x, y) = (3MN)^2 \times \sum_{k=0}^{3}\sum_{l=0}^{3} \frac{(-1)^{k+l}(x-(k+m)/M)^2 + (y(l+n)/N)^2 +}{(3-k)!(3-l)!k!l!}. \quad (28)$$

The block differential tone approximation function $S(x_i, y_j)$ is expanded on the bases $\Psi_{mn}(x, y)$ by the following equation.

$$S(x_i, y_j) = \sum_{n=-2}^{N-1}\sum_{m=-2}^{M-1} C_{mn}\Psi_{mn}(x_i, y_j). \quad (29)$$

The coefficients $\{c_{mn}\}$ of a linear combination of spline bases are real numbers. M and N are division numbers in x-direction and y-direction of base functions. Hence, one block is divided into M pieces in x-direction and is divided into N pieces in y-direction. A quadratic spline function is a simple polynomial, which has definite values only in three pieces. Suffix of m is attached to the spline base expanding from the m-th piece to the (m+2)-th piece. The parameter m takes integers from −2 to (M−1), and the spline bases from −2 to (M−1) are necessary. The number of necessary bases is not M but (M+2). $\Psi_{mn}$ is a direct product of the spline bases in x-direction by the spline bases in y-direction defined on (M+2)(N+2) pieces. S(x, y) contains (M+2)(N+2) spline bases. $\Psi_{mn}$ becomes a different function when the division numbers M and N are different. The dimensional number is, however, omitted for simplicity.

There are also the same number of coefficients $\{c_{mn}\}$. that is, (M+2)(N+2), which are unknown. The approximation of differential images results in determining the coefficients $\{c_{mn}\}$. The coefficients $\{c_{mn}\}$ should be determined for approximating the differential images as precise as possible. The coefficients $\{c_{mn}\}$ capable of making the smallest difference between S and diff is required for the given division numbers of M and N. These coefficients $\{c_{mn}\}$ are estimated by some predetermined criterion. If the coefficients $\{c_{mn}\}$ do not satisfy the criterion, the division numbers M and N are increased by one, that is, to (M+1) and (N+1). The least square method and the biorthonormal function method are also available for determining the approximation coefficients of differential images. Both methods have been once described before as the ways for approximating the subboundaries. The biorthonormal function method which has been contrived by this Inventor is superior to the least square method in reducing the time of calculation. Of course, the least square method can be applied to the determination of $\{c_{mn}\}$. Both will be explained here.

[A. Calculation of $c_{mn}$ by the Least Square Method]

The least square method has been explained before for approximating subboundaries. There is the difference in using the least square method between the subboundary approximation and the block tone approximation, that is, the boundary approximation is based on the one-dimensional functions, and the block tone approximation must use the two-dimensional functions. The least square method is used for obtaining proper coefficients by minimizing the sum Q of the squares of the differences (errors) between the measured value and the approximated value in the coordinates of all pixels. Hence, $$Q = \sum_{i=0}^{I}\sum_{j=0}^{J} \{S(x_i, y_j) - diff(x_i, y_j)\}^2. \quad (30)$$

Q is defined by the above equation, where all pixels of the block images from 0 to I in x-coordinate and from 0 to J in y-coordinate are added. I×J is the size of a block. Since the corner pixel of a block is overlapped, the x-coordinate is not from 0 to I−1 but from 0 to I. Since the optimum coefficients $\{c_{mn}\}$ should make Q minimum, the differentials of Q by all the coefficients $\{c_{mn}\}$ should be zero.

$$\sum_{p=-2}^{N-1}\sum_{q=-2}^{M-1} c_{pq}\sum_{i=0}^{I}\sum_{j=0}^{J} \Psi_{pq}(x_i, y_j)\Psi_{mn}(x_i, y_j) = \quad (31)$$

$$\sum_{i=0}^{I}\sum_{j=0}^{J} diff(x_i, y_j)\Psi_{mn}(x_i, y_j).$$

The above equations hold for the division number m ranging from −2 to (M−1), and the division number n ranging from −2 to (N−1). There are (M+2)(N+2) equations in Eq.(31). $\Psi_{pq}(x_i, y_j)$ and $diff(x_i, y_j)$ are known, so that they are (M+2)(N+2)-dimensional simultaneous equations regarding $c_{pq}$. Since they are one-dimensional (linear) simultaneous equations, it should be possible to solve them. But it is not easy to solve this equation including (M+2)(N+2) unknown variables. If a block of the differential image is small enough in size, that is, small I and small J, the calculation may be possible. However, if a block of the differential image is large in size, that is, I and J are large, the calculation is difficult. Such the difficulty becomes larger as the division numbers M and N rise higher. High M and N bring about 100 to 500 simultaneous equations. The approximation of differential tones having two-dimensional variables brings about a lot of unknown variables and simultaneous equations. Such a calculation may be possible by using a high performance computer with large memories, but the least square method seems to be useless in practice.

[B. Method of Using the Biorthonormal Function Method]

The biorthonormal function is an abstract concept for expressing coefficients of a function expanded on the spline functions without orthonormality. The coefficients, which are obtained by expanding an arbitrary function by spline bases, are given by the integration of the product of the function by the corresponding biorthonormal function. When the biorthonormal function of the spline bases $\Psi_{mn}(x, y)$ is shown by $\Phi_{mn}(x, y)$, the arbitrary function $W(x, y)$ is expanded on spline bases $\Psi_{pq}(x, y)$ by the following equation.

$$W(x, y) = \Sigma c_{pq} \Psi_{pq}(x, y). \quad (32)$$

The coefficients are given by $$c_{pq} = \int\int \Phi_{mn}(x, y) W(x, y) dx dy. \quad (33)$$

On the contrary, when the arbitrary function is expanded on $\Phi_{pq}$, the coefficients $\{d_{pq}\}$ are given by the integration of the product of the function by $\Psi_{pq}$.

$$W(x, y) = \Sigma d_{pq} \Phi_{pq}(x, y). \quad (34)$$

$$d_{pq} = \int\int \Psi_{pq}(x, y) W(x, y) dx dy. \quad (35)$$

To establish the relationship that $\Phi_{mn}$ and $\Psi_{mn}$ are reciprocally biorthonormal functions, $$\int\int \Psi_{mn}(x, y) \Phi_{pq}(x, y) dx dy = \delta_{mp} \delta_{nq}. \quad (36)$$

Here, $\delta_{mn}$ is Kronecker's delta. Since $\Psi_{mn}(x, y)$ is the direct product of one-variable bases, $\Phi_{pq}(x, y)$ is also given by the direct product of one-variable biorthonormal functions. Hence, $\Phi_{pq}$, which is two-variable biorthonormal function, is only the product $M_p(x)M_q(y)$ of a one-variable biorthonormal function $M_p(x)$ by another one-variable biorthonormal function $M_q(y)$. Such a biorthonormal function $\Phi_{pq}(x, y)$ are previously calculated and stored in the memory as a table.

Whereby two-parameter coefficient $c_{pq}$ can be calculated easily by the following equation.

$$c_{pq} = \int\int \text{diff}(x, y) \Phi_{pq}(x, y) dx dy. \quad (37)$$

Since $\Phi_{pq}$ is surely varied by the change of division numbers of M and N, $\Phi_{pq}$ has plenty of numbers of different p, q, M and N. In this biorthonormal function method, the calculation including the spline bases $\Psi_{mn}(x, y)$ is absolutely unnecessary for the approximation calculation. Only the biorthonormal function $\Phi_{mn}$ is necessary. Actually, it is unnecessary to store the base function of $\Psi_{mn}$ in the memory. (But the regeneration on the receiving side requires the base functions of $\Psi_{mn}$).

When the capacity of memory is insufficient for storing $\Phi_{pq}$ for every division number of M and N, the one-variable biorthonormal function $M_p$ is stored in the memory, and the produce of two functions, that is, $M_p(x)M_q(y)$ is calculated from $M_p(x)$ and $M_q(y)$ at the necessary time. This way requires an extra time but alleviates the amount of memory.

[Estimation of Differential Image Approximation]

The differential image approximation must be estimated by the difference of $S(x, y)$ from diff$(x, y)$. $\{S(x, y)-\text{diff}(x, y)\}$ is an error of the tone approximation at a pixel $(x, y)$. The average squared error is normalized by dividing by $L^2$. L is the number of steps of tone. The tones are quantized into $(L+1)$ levels of $0, 1, 2, \ldots, L$. The inverse of the normalized average squared error, which is denoted by "SNR", is a measure of the accuracy of approximation. The larger the SNR is, the higher the accuracy of approximation rises. A critical value $\epsilon'$ is predetermined for estimating the exactness of the approximation. Namely, the approximation of block tones is repeated by increasing M and N to M+1 and N+1 step by step respectively until SNR>$\epsilon'$.

$$SNR = 10 \log \frac{L^2(I+1)(J+1)}{\Sigma\{S(x_i, y_j) - \text{diff}(x_i, y_j)\}^2}. \quad (38)$$

When the approximation attains the accuracy satisfying the inequality of SNR>$\epsilon'$, the calculation is ended, and the current M, N and $\{c_{mn}\}$ are confirmed as final M, N and $\{c_{mn}\}$ respectively. When SNR<$\epsilon'$, the approximation of block tones is repeated by increasing the division numbers of M and N by one respectively until SNR>$\epsilon'$. $\epsilon'$ is an important parameter for ruling the correctness of the approximation.

[O. COMPRESSED DATA MEMORY DEVICE]

The compressed data approximating differential image are output from the data approximation device N. The compressed data memory device O memorizes these compressed data. The compressed data include the x-division number M, the y-division number and coefficients $\{c_{mn}\}$ of every differential block. Table 2 denotes the sizes of the data that are stored in the compressed data memory device O.

TABLE 2

SIZES OF THE DATA OF THE BLOCK APPROXIMATION

| | SUBSTANCE | DATA SIZE |
|---|---|---|
| DIFFERENTIAL IMAGE | DIVISION NUMBERS | 2 bytes |
| | COEFFICIENTS | 2MN bytes |

[P. ENCODING DEVICE]

The region data (the result of boundary approximations) and the compressed data (the result of differential image approximations) have already been obtained through the steps hitherto. These data are stored in the regional data memory device (I) and the compressed data memory device (O), respectively. It is possible to send these data, as they are, without additional processing to the receiving side by some transmission medium. The gists of the present invention are two above approximations, that is, the boundary approximation and the differential image approximation for reducing the amount of data. Otherwise, it is also possible to compress these data further and store the doubly compressed data in other memories.

Encoding is one way to reduce further the amount of data. Such an encoding has already been used in the conventional communication systems for protecting secret. Encoding is absolutely different from the method of the present invention making use of the spline function approximation. The approximation differs from the encoding for protecting information. The encoded data are able to be exactly recovered. Hence, there is no change in the quality of data. Encoding is effective not only in keeping the secret but also in reducing the amount of data. The encoding plays a role of protecting secrets and a role of reducing data.

Here, this embodiment employs Huffman's encoding method or other encoding means. Both of the data, the region data of (I) and the compressed data of (O), are encoded. The encoding requires the processing time. The receiving side must carry out decode. The amount of data is decreased but the time for processing is increased. The transmission time is reduced but the processing time is increased on both the receiving side and the sending side. Therefore, the adoption of the encoding step is optional, which should be determined in accordance with the purpose of the image processing.

[Q. ENCODED DATA OUTPUTTING DEVICE]

The encoding device (P) encodes the region data (boundaries and average-tone images) and the compressed data (differential images). The encoded data outputting device (Q) outputs the encoded data in a series of bit trains. It is impossible to decode the encoded data as long as the means of decoding is not found out on the receiving port. The encoding plays a role of protecting the secrets.

[R. ENCODED DATA MEMORY DEVICE]

The encoded data memory device (R) memorizes the encoded data outputting from the encoded data outputting device (Q). The data memorized in this device (R) are output at a desired moment by the outputting order. The devices from (A) to (R) are a series of devices of inputting a picture, compressing data and memorizing the data. Furthermore, some devices for processing the data are necessary to transmit the data from the sending side to the receiving side.

[Γ. COMMUNICATION DATA PRODUCING DEVICE]

Figure 6:
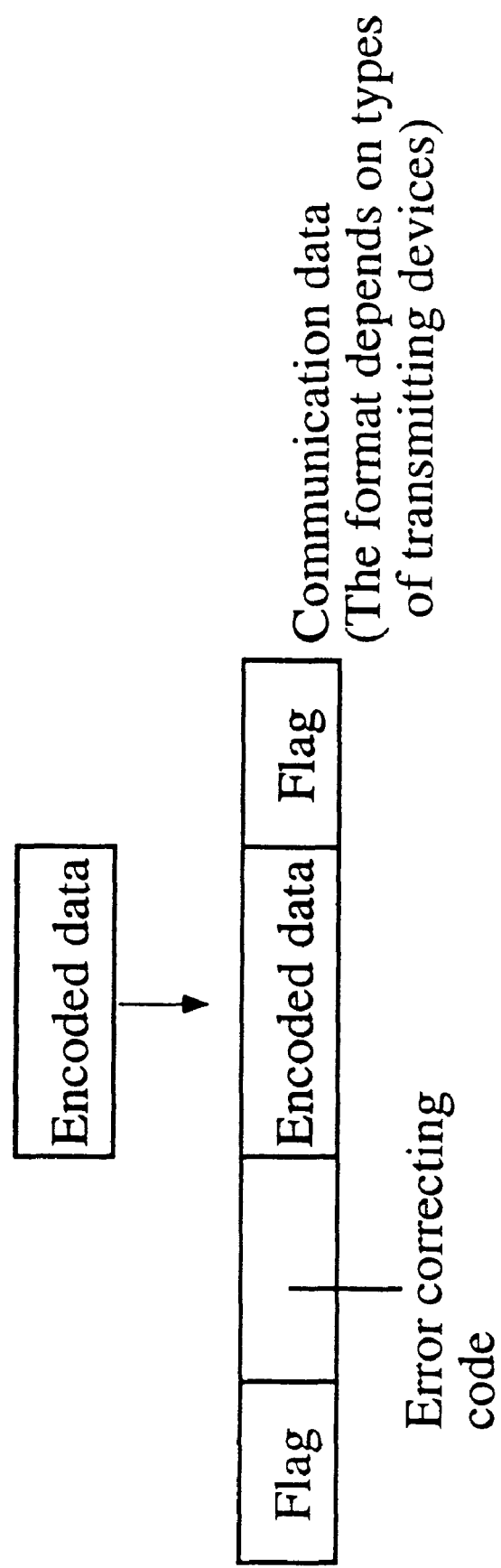
FIG. 6 is an explanatory figure showing the operation of exchanging encoded data to transmitting data where the encoded data annexing flags and error codes in front of the data and annexing flags behind the encoded data.

The communication data producing device (Γ) changes the encoded data to communication data. The conventional structure of communication data is available. FIG. 6 shows the transformation from the encoded data to the communication data. In general, this processing is carried out automatically by a modem. The encoded data follow a flag and an error code, and the other flag ends the data train. The first flag is a starting signal, and the last flag is an ending signal. The error code is annexed in order to detect an error on the receiving side when noise happens to occur during the communication. If the signals including noise are sent as they are to the receiving side, a picture in error is reproduced on the receiving side. To avoid such a mistake, the receiving side is able to detect an occurrence of error and returns a request for sending the same data again to the sending side.

[Δ. COMMUNICATION DATA TRANSMITTING DEVICE]

The communication data transmitting device (Δ) transmits the communication data to the receiving side. The communication data transmitting device is like a communication modem shown by FIG. 1. Such a communication modem is necessary when the communication relies upon telephone lines or exclusive lines. The digital signals obtained by encoding must be changed to analog signals in the case of using telephone lines. Therefore, a digital/analog conversion device is required at the data-sending side. On the contrary, the data-receiving side needs an analog/digital conversion device for changing analog signals to digital data. An optical fiber is also available as a communication medium besides telephone lines or other lines. When an optical fiber is used for transmitting communication data, the sending node (side) requires an E/O conversion module having a semiconductor laser or an LED. It is possible to use not only wire media but also wireless media. Wireless transmission requires other devices, for example, a modulator, a transmitter and so on, for loading sending signals on the carrier waves modulated by AM modulation, FM modulation, phase shift modulation and so on. Conventional technique easily puts the procedures into practice. The communication media send the compressed image data from the data-sending side to the data-receiving side. The devices from (A) to (Δ) are necessary on the data-sending side. The following devices are installed on the data-receiving side. The data-receiving side carries out the processes reverse to that of the data-sending side. Therefore, the reverse processing on the receiving side will be briefly explained.

[Θ. COMMUNICATION DATA RECEIVING DEVICE]

The communication data receiving device (Θ) is the first one of the data-receiving side devices. The communication data receiving device (Θ) is similar to a communication modem of FIG. 1. A great variety of transmitting devices are employed in accordance with the transmitting media. That has been described in the above section. There are many kinds of data receiving devices. The communication data receiving device (Θ) suitable for the medium should be set on the receiving side. The following devices are equipped on the receiving side. The data-sending side prepares individual devices corresponding to each of data-sending side devices, but it is possible to provide one device capable of doing both operations of sending and receiving data. Optical fiber transmission requires an O/E conversion module having a photodiode and an amplification circuit. Modulated signals require a demodulator of AM modulation, FM modulation or PS modulation. Analog signals via telephone lines are reversed to digital signals.

[S. ENCODED DATA INPUTTING DEVICE]

The encoded data inputting device (S) reads and stores the encoded data that have been received by the communication data receiving device (Θ) and have converted to digital signals, if digital signals had once converted to analog signals.

[T. DECODING DEVICE]

The encoding device (T) decodes the encoded data from the encoded data inputting device (S). The decoding method must correspond to the encoding method. If the decoding method is unknown, it is impossible to know about the content of transmitting data. Hence, the data cannot be decoded without the pertinent decoding software. Thus the information is kept in secret to the third party. That has been mentioned above. The decoded data include both the differential image data and the regional data, and have the same form as the data stored in the compressed data memory device (O) and the regional data memory device (I).

[U. DIFFERENTIAL BLOCK REVIVAL DEVICE]

The differential block revival device (U) retrieves differential images from the compressed data (differential image data) that have been encoded. The compressed data contain the x-division number M, the y-division number N and the spline coefficients $\{c_{mn}\}$. The differential tones $S(x_i, y_j)$ at each sampling point $(x_i, y_j)$ in a block are represented by $$S(x_i, y_j) = \sum_{n=-2}^{N-1} \sum_{m=-2}^{M-1} c_{mn} \Psi_{mn}(x_i, y_j) \qquad (39)$$

$$= \sum_{n=-2}^{N-1} \sum_{m=-2}^{M-1} c_{mn} N_m(x_i) N_n(y_j). \qquad (40)$$

The spline base functions $N_m$ have already been mentioned, but will be explained again hereafter.

The differential tone blocks are revived block by block, and all the pixels in the picture gain concrete differential tones. Such the differential tone revival operation is practiced for all the blocks of Q.

[V. DIFFERENTIAL IMAGE RETRIEVE DEVICE]

The differential image retrieve device (V) makes the entirety of differential images by assembling the retrieved differential image blocks lengthwise and crosswise. The differential image has so small tone difference and so small variation of tone difference that there occurs no block deformation at the joining margins when the blocks are connected. When the entirety of differential images has been approximated at a stretch without dividing the differential images into blocks on the data-sending side, the whole of differential images shall be retrieved at a stroke by the device unifying both the differential block revival device (U) and the differential image retrieve device (V) on the receiving side.

[W. CONTINUAL TONE IMAGE REGENERATION DEVICE]

The continual tone image regeneration device (W) retrieves a continually-changing tone image by reviving an average tone image, and by adding the average tone picture to the differential images that have already been obtained. The regeneration of the average tone image is carried out by the steps of retrieving the subboundaries from the encoded regional data, joining the subboundaries into boundaries, making regions enclosed by the boundaries and painting the regions with the average tone.

The regeneration of boundaries is done by the following steps. Here, the interval (subboundary) to be retrieved is denoted as [0, T] which shows the whole length of a subboundary (partial line) divided by branch points and turning points by T. Since the subboundary is expressed by an intermediate parameter, T does not correspond to the actual length of the subboundary. It is possible to determine T as an arbitrary length or as a constant length.

Parameter "n" is the division number of spline functions. A length of one piece is T/n, and nodes are shown by MT/n (M is an integral number from 0 to n). The spline base N, of approximation functions at each sample point $t_i$ has definite values only in the three pieces from pT/n to (p+3)T/n, and has a peak at (p+3/2)T/n. $N_p$ is the simplest quadratic function having definite values in three pieces. Here, the suffix i of $t_i$ is omitted. Hence, $t_i$ is shown by t for simplicity, and T/n is denoted as $\Delta$.

$$N_p(t)=0,\ t \leq p\ \Delta. \tag{41}$$

$$N_p(t)=0.5\ \Delta^{-3}(t-p\ \Delta)^2,\ p\ \Delta < t \leq (p+1)\ \Delta. \tag{42}$$

$$N_p(t)=0.75\ \Delta^{-3} - \Delta^{-3}\{t-(p+1.5)\ \Delta\}^2,\ (p+1)\ \Delta < t \leq (p+2)\ \Delta. \tag{43}$$

$$N_p(t)=0.5\ \Delta^{-3}\{(p+3)\ \Delta-t\}^2,\ (p+2)\ \Delta < t \leq (p+3)\ \Delta. \tag{44}$$

$$N_p(t)=0,\ (p+3)\ \Delta < t. \tag{45}$$

It seems difficult. But the above is the simplest quadratic equation. The coefficients are only required to satisfy the condition that the function itself and the first differential are continual at the nodes and the integral is 1. These simple functions have been used for approximating boundaries and differential images on the data-sending side. The concrete form has been explained here again by changing the form a little. The data-sending side has used the same function. Since base functions have parallel displacement symmetry, that is, $N_p(t)=N_{p-q}(t-\Delta q)$, all of the base functions are simply given from $N_o(t)$. Since the coefficients $\{c_{xp}, c_{yp}\}$ of base functions showing the subboundaries are known from the received regional data, the boundaries are given by the following equations.

$$s_x(t_i) = \sum_{p=-2}^{n-1} c_{xp} N_p(t_i). \tag{46}$$

$$s_y(t_i) = \sum_{p=-2}^{n-1} c_{yp} N_p(t_i). \tag{47}$$

The revived subboundaries, the readout turning points and branch points build up boundaries. Regenerated boundaries define regions. The regions and the readout average tones construct the average tone image. A sum of the average tone image and the differential tone image revives the original picture.

[X. CONTINUAL TONE IMAGE OUTPUTTING DEVICE]

All the parameters specifying the continually-changing tone images have been calculated and regenerated. Finally, the revived image must be output in a concrete form by, for example, a printer and so on, on a sheet of paper or cloth. Further, it is possible to use other different outputting systems according to the purpose. It is of course possible to regenerate a picture in an original size. Since the picture is regenerated by calculation, it is feasible to enlarge or reduce the size of picture. It is desirable to use a large printer or a wide cutting plotter for enlarging the object picture. Further, it is possible not only to print on a sheet of paper by a printer but also to cut a sheet in patterns by a cutting plotter. Furthermore, it is possible to output an enlarged picture on a large image display.

For example, a layout editor, which can reproduce images in size from a small 1 mm×1 mm square to a wide, long rectangle of a 90 cm width and a 16 m length, can be adopted for regenerating the object picture from the coefficients of the spline base functions. The reproduced picture is output, e.g. by a post-script printer endowed with a resolution of more than 600 DPI.

The monochromatic continual tone picture can be input, compressed, memorized, regenerated and output by the devices from (A) to (X) that have been explained. If the original picture is a color continually-changing tone one, the color picture is solved into three or four components (primary colors), and the continually-changing tone treatment is carried out for each component color. Therefore, the data-sending side requires a color resolution device for resolving the color picture into several primary color pictures. On the other hand, the data-receiving side needs a color synthesis device for synthesizing the resolved primary color pictures. These devices will be explained later in detail.

[Y. COLOR RESOLUTION DEVICE]

The color resolution device (Y) can resolve a color picture into component color pictures (primary colors). There are several ways for resolving a color picture into component monochromatic pictures. The set of three primary colors RGB (red, green, and blue) has been widely employed for mixing light color component pictures into a unified color picture like color television display or color photographs. Hence, the original color picture is resolved into three continually-changing tone pictures, that is, an R continually-changing tone picture, a G continually-changing tone picture and a B continually-changing tone picture. The component pictures are treated simultaneously in parallel or successively in series.

The RGB resolution, however, has the drawback of a strong correlation among R, G and B, which is not much suitable for encoding. Otherwise, the other three component resolution to primary colors YUV is a better alternative. The YUV resolution which has been often utilized for color information transmission is based on three components Y, U and V that are given by nearly-orthogonal linear combinations of R, G and B. In this case, the original picture is resolved into three continually-changing tone pictures, that is, a Y continually-changing tone picture, a U continually-changing tone picture, and a V continually-changing tone picture. Since the original color picture is resolved into three monochromatic continually-changing tone pictures of Y, U and V, each monochromatic continually-changing tone picture is treated simultaneously in parallel or successively in series.

In the case of color printing, four primary color component resolution CMYK (cyan, magenta, yellow and black) is used for reinforcing black tone in the color printing. The four primary color pictures are input into four independent image processing devices which have entirely the same system as shown in FIG. 1 on the sending side. The approximation treatment and the encoding treatment are done in every component. The four sets of compressed information are transmitted from the data-sending side to the data-receiving side.

[Z. COLOR SYNTHESIS DEVICE]

The color synthesis device is set in the data-receiving side in order to deal with a color picture. All the continually-changing tone pictures of the color components are regenerated. The color synthesis device synthesizes these monochromatic continually-changing tone pictures of the primary colors and outputs a color picture. The synthesis must correspond to the resolution. Some outputting machine can synthesize these monochromatic continually-changing tone pictures automatically into a unified color picture. In this case, the color synthesis device (Z) can be omitted.

The devices from (A) to (X) can deal with a monochromatic continually-changing tone picture. A color picture can be treated by the devices from (A) to (Z). The last outputting system will be explained. Since a picture is memorized as coefficients of the spline base functions, arbitrary enlargement and reduction are available. Further, it is possible to allot different magnifying power to the horizontal direction and the vertical direction. Furthermore, it is possible to indicate the coordinates of the picture at arbitrary positions. Therefore, an arbitrary continually-changing tone picture including binary pictures such as characters and so on is able to be output in an arbitrary position and an arbitrary size.

The above-mentioned system is able to be mounted in a computer such as UNIX WORK STATION or WINDOWS-OS by the program using C++ language.

[PREFERRED EXAMPLES FOR VERIFYING EFFECTS]

Figure 7A:
FIG. 7(a) is an original picture of "Girl" which will be treated by the present invention as an example of a continually-tone picture. This original picture of "Girl" is transmitted by the steps of inputting the original picture, approximating the data of the inputted picture, compressing the approximated data of the inputted picture, compressing the approximated data and encoding the compressed data.
Figure 7B:
FIG. 7(b) is an original picture of a Chinese character "愛" which will be treated by the present invention as an example of a binary picture. This original picture is transmitted by the steps of inputting the original picture, approximating the data of the inputted picture, compressing the approximated data and encoding the compressed data.

In order to examine the performance of the present invention, the method of this invention is applied to (A) "SIDBA/GIRL" as an example of continually-changing tone pictures and to (B) "愛" in the MS Gothic font as an example of binary-tone pictures. FIG. 7(a) shows the original picture of "GIRL", and FIG. 7(b) is the original picture of "愛".

A. EXAMPLE 1

Girl

The present invention enables a parameter to prescribe the quality of a revived picture. The experiment result is shown when the quality of the original picture and the quality of the revived picture are set to be 30 dB (p-p/rms). When the picture is encoded keeping the revived picture quality of 30 dB, the bit rate showing the amount of data was 1.98 (bit/pixel). Since the original picture is expressed by 8 (bit/pixel), the data is compressed to about 25%. It becomes about 129761 bits for example 1 "GIRL", which is reduced to the actual amount of data. Less than 20000 bytes are the amount of data actually sent, when error encoding bits are added. Here 1 byte=8 bits.

There are various kinds of lines for transmitting data, for example, telephone lines, exclusive lines, pocket telephones and so on. The times necessary in transmitting are different for media. When a telephone line is used, for example, a standard modem, which is installed in a personal computer on sale now, has a transmission speed of 28,800 [bps]. If this modem is used, it takes 5 seconds to transmit the compressed data of 20,000 bytes of the picture "GIRL" to the data-receiving side.

Digital exclusive lines such as ISDN are prevailing recently. If an ISDN having a communication speed of 38,400 [bps] is used, it takes about four seconds to transmitting the same to the counter part.

Digital pocket telephone enjoys a communication speed of 9,600 [bps]. When such a digital pocket telephone is used, the data of the picture are transmitted to the counter part in about 15 seconds.

Figure 8A:
FIG. 8(a) is a regenerated picture of the original picture of "SIDBA/Girl" as an example of continually-tone pictures in which the quality of received picture from the encoded data is defined to be 30 dB(p-p/rms), and the regenerated picture is produced in the receiving side.

FIG. 8(a) shows the regenerated picture on the receiving side. The regenerated picture is faithful to the original picture. This example sets 30 dB of the quality of picture but a 40 dB quality of picture is also available. FIG. 9 shows the revived picture in the case of a 40 dB quality of picture. This is more faithful to the original picture. There is no inferiority therebetween. FIG. 8 and FIG. 9 are the same as the original picture in size. Further, the present invention is capable of enlarging or reducing the size of picture.

Figure 10A:
FIG. 10(a) is a revived picture in a smaller size of the original picture of "SIDBA/Girl".
Figure 10B:
FIG. 10(b) is a revived picture in the same size of the original picture of "SIDBA/Girl".
Figure 10C:
FIG. 10(c) is a revived picture in a larger size of the original picture of "SIDBA/Girl".

FIG. 10(a) is a revival picture in a reduced size, FIG. 10(b) is a revival picture of the same size, and FIG. 10(c) is a revival picture in an enlarged size. As shown in these figures, pictures are freely reduced or enlarged because these pictures are provided by compressing the data by calculation and regenerating the picture by calculation from the compressed data.

B. EXAMPLE 2

愛(Binary Tone Picture)

The main purpose of the present invention is the processing of continually-changing tone pictures. Of course, the present invention can treat binary tone pictures which are so simpler than continually-changing tone pictures. The binary tone pictures are dealt with by the same processes as the continually-changing tone pictures. When the picture is divided into a plurality of regions by the difference of tones, the regions have only two values of tones. The boundaries coincide with the outlines of definite figures, characters or so on. The differential image has a uniform tone. Therefore, the processing is simplified and the time of processing becomes short. The amount of data for expressing the approximation result is small. The present invention is, however, different from Japanese Laid Open Patent No.6-83952 and Japanese Laid Open Patent No.6-96191 that aimed at the processing of only binary tone pictures. In these prior documents, the coordinate points are taken at the centers of pixels, so that the outlines cross the centers of pixels. If differential images were formed, a strong discontinuity would appear on boundaries. The example of transmitting and receiving "愛" by the communication device of this invention A will be explained.

Here, "愛" is written with a gothic character, and is shown in FIG. 7(b). There appears a zigzag line on the upper diagonal line of "愛".

In this case, the original picture is expressed with 256 pixels×256 pixels, so that a saw-like outline appears in the diagonal line. The compressed data amount is 0.22 bit/pel when "愛" is treated by the present invention. Since the number of bits per pixel is 1 bit/pel in the original picture, the data are compressed to about 22%. The actual data amount is 14418 bits. When error encoding bits are added to the compressed data, the amount of data becomes about 16000 bit (2000 bytes). This is the data for communication of the binary tone example.

When a telephone line is used, for example, it takes about 0.6 seconds to transmit the data of "愛" because the speed of transmitting of a standard installed modem is 28800 [bps]. When an ISDN having a transmitting speed of 38400 [bps] is used, it takes about 0.4 seconds to transmit these data, which is shorter than the telephone line. If a pocket telephone with a 9600 [bps] transmitting speed is used, it takes about 1.5 seconds to send the same data.

Figure 8B:
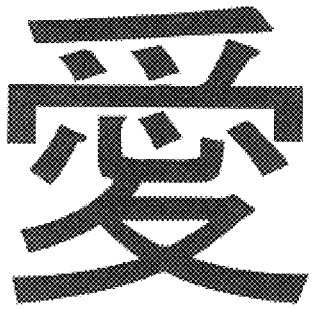
FIG. 8(b) is a regenerated picture of the original picture of "愛" as an example of binary pictures in which the quality of received picture from the encoded data is defined to be 30 dB(p-p/rms), and the regenerated picture is produced in the receiving side.
Figure 9:
FIG. 9 is a regenerated picture of the original picture of "SIDBA/Girl" in which the quality of received picture is defined to be 40 dB(p-p/rms), and the regenerated picture is produced in the receiving side. There is mostly no difference between the original picture and the regenerated picture.

FIG. 8(b) shows a regenerated picture of "愛". The zigzag line, which has once appeared in the slanting line of the original picture of "愛", vanishes. The zigzag lines are improved to smooth lines by this invention, because this invention approximates an original picture by calculation and regenerates a picture by calculation. The regenerated picture is rather superior to the original picture. This is an epockmaking invention. There has never existed such an excellent invention like this invention.

This invention is capable of reading continually-changing tone pictures, reducing the amount of data, and transmitting the reduced data. There is no need of transmitting the data by the bit map forms or the DCT method. Since this invention can reproduce a continually-changing tone picture faithful to the original picture by the spline base functions, the quality of picture is maintained.

The present invention realizes not only easy transmission but also easy regeneration. It is possible to regenerate an original picture in an arbitrary size from the transmitted data. The enlargement and reduction are carried out not on the bit map but by the calculation of functions. Thus it is easy to obtain an enlarged or reduced picture in excellent quality of picture.

The present invention is superior in the time of transmission. Since hard wares are advancing day by day, there is no great difference of transmission time between this invention and facsimile. This invention is, however, greater than facsimile in the quality of picture. Facsimiles cannot transmit, for example, a block copy of printing which requires extremely high quality of picture. Such a block copy of printing is used to be sent by mail at the present time. The present invention can transmit such a block copy of printing by telephone lines, exclusive lines, pocket telephones and so on. The time for sending is drastically reduced by the present invention in comparison with the mail. This is an outstanding invention.

What is claimed is:

1. A communication apparatus for continually-changing tone pictures comprising: a data-sending side, a data-receiving side and a transmitting system for transmitting data between the data-sending side and the data-receiving side;

the data-sending side comprising:

an image memory device for reading in data of a continually-changing tone picture by optically reading device, e.g. an image scanner, a digital camera, taking a continually-changing tone picture out from an image data base or inputting the data of a continually-changing tone picture directly, and for memorizing tones of the continually-changing tone picture by corresponding tones of pixels to coordinate points taken at centers of individual pixels aligning in a horizontal direction and in a vertical direction on an image plane;

a region division device for dividing the input continually-changing tone picture into a plurality of regions as tone differences among the pixels belonging to the same region are smaller than a critical value and tone differences between neighboring regions are larger than the critical value, and for reckoning an average-tone of the pixels in every region;

a boundary-extracting device for extracting boundaries dividing neighboring regions as a series of another coordinate points defined at corners of pixels;

a branch point-extracting device for extracting points which are in contact with three or more than three regions on the boundaries extracted by the boundary extracting device as branch points;

a boundary memory device for memorizing two-dimensional coordinates (x, y) of the points on boundary intervals divided by the branch points;

a turning point-extracting device for extracting points at which a boundary interval turns at an angle more than a definite value as turning points which divide the boundary interval into a plurality of subboundaries;

a boundary-approximating device for approximating a series of points in every subboundary divided by branch points or turning points by using single-variable spline functions where t is an intermediate, independent variable and x and y are dependent variables, and for producing approximation functions of the series of points by repeating approximation of every subboundary by using a least square error method or a biorthonormal function method till errors become smaller than a critical value;

a regional data memory device for memorizing information of the approximation functions of the subboundaries and relations of the subboundaries to the regions;

a differential image production device for producing a differential image by subtracting the average-tone image from the input image at all pixels;

a differential image memory device for memorizing differential tones of the pixels aligning in x-direction and in y-direction in the differential image;

a differential image division device for dividing a differential image into a plurality of blocks;

a differential block memory device for memorizing the differential tones of every block by corresponding to the pixels aligning in x-direction and in y-direction;

a data approximation device for approximating differential block images by two-variable spline functions and for producing approximation functions of every block as compressed data by repeating a least square method or a biorthonormal function method till errors become smaller than a critical value;

a compressed data memory device for memorizing parameters of the approximation functions of the differential image;

an encoding device for encoding the compressed data;

an encoded data outputting device for outputting encoded data; and an encoded data memory device for memorizing the encoded data;

the transmitting system comprising:

a communication data producing device;

a communication data transmitting device;

a data transmitting medium;

a communication data receiving device; and an encoded data inputting device;

the data-receiving side comprising:

a decoding device for retrieving the compressed data by decoding the encoded, inputted data;

a differential block revival device for regenerating the differential block images from the compressed data;

a differential image retrieve device for retrieving the entirety of differential images by assembling all differential blocks;

a continual tone image regeneration device for regenerating a continually-changing tone image by reviving regions, making an average tone image and adding the average tone image to the differential tone image; and a continual tone image outputting device for outputting the retrieved continually-changing tone image.

2. A communication apparatus for continually-changing tone pictures comprising: a data-sending side, a data-receiving side and a transmitting system for transmitting data between the data-sending side and the data-receiving side;

the data-sending side comprising:

an image memory device for reading in data of a continually-changing tone picture by optically readin device, e.g. an image scanner, a digital camera, taking a continually-changing tone picture out from an image data base or inputting the data of a continually-changing tone picture directly, and for memorizing tones of the continually-changing tone picture by corresponding tones of pixels to coordinate points taken at centers of individual pixels aligning in a horizontal direction and in a vertical direction on an image plane;

a region division device for dividing the input continually-changing tone picture into a plurality of regions as tone differences among the pixels belonging to the same region are smaller than a critical value and tone differences between neighboring regions are larger than the critical value, and for reckoning an average-tone of the pixels in every region;

a boundary-extracting device for extracting boundaries dividing neighboring regions as a series of another coordinate points defined at corners of pixels;

a branch point-extracting device for extracting points which are in contact with three or more than three regions on the boundaries extracted by the boundary extracting device as branch points;

a boundary memory device for memorizing two-dimensional coordinates (x, y) of the points on boundary intervals divided by the branch points;

a turning point-extracting device for extracting points at which a boundary interval turns at an angle more than a definite value as turning points which divide the boundary interval into a plurality of subboundaries;

a boundary-approximating device for approximating a series of points in every subboundary divided by branch points or turning points by using single-variable spline functions where t is an intermediate, independent variable and x and y are dependent variables, and for producing approximation functions of the series of points by repeating approximation of every subboundary by using a least square error method or a biorthonormal function method till errors become smaller than a critical value;

a regional data memory device for memorizing information of the approximation functions of the subboundaries and relations of the subboundaries to the regions;

a differential image production device for producing a differential image by subtracting the average-tone image from the input image at all pixels;

a differential image memory device for memorizing differential tones of the pixels aligning in x-direction and in y-direction in the differential image;

a data approximation device for approximating differential tone image by two-variable spline functions and for producing approximation functions of the differential tone image as compressed data by repeating a least square method or a biorthonormal function method till errors become smaller than a critical value;

a compressed data memory device for memorizing parameters of the approximation functions of the differential image;

an encoding device for encoding the compressed data;

an encoded data outputting device for outputting the encoded data;

an encoded data memory device for memorizing the encoded data;

the transmitting system comprising:

a communication data producing device;

a communication data transmitting device;

a data transmitting medium;

a communication data receiving device; and an encoded data inputting device;

the data-receiving side comprising:

a decoding device for retrieving the compressed data by decoding the encoded, inputted data;

a differential image retrieve device for regenerating the differential tone image from the compressed data;

a continual tone image regeneration device for regenerating a continually-changing tone image by reviving regions, making an average tone image and adding the average tone image to the differential tone image; and a continual tone image outputting device for outputting the retrieved continually-changing tone image.

3. A communication apparatus for color pictures comprising a data-sending side, a data-receiving side and a transmitting system for transmitting data between the data-sending side and the data-receiving side;

the data-sending side comprising:

a color image memory device for reading in data of a color picture by optically reading device, e.g. an image scanner, a digital camera, taking a color picture from an image data base or inputting the data of a color picture directly, and for memorizing continually-changing tones of primary colors of the input color picture by corresponding tones of primary colors to coordinate points taken at centers of individual pixels aligning in a horizontal direction and in a vertical direction on an image plane;

a color resolution device for resolving data of the input image into a plurality of primary color images and making data of the continually-changing tones of the primary colors;

an image memory device for memorizing tones of pixels of primary color images resolved by the color resolution device by corresponding tones of pixels to coordinate points taken at centers of individual pixels aligning in a horizontal direction and in a vertical direction on an image plane;

a region division device for dividing each of the continually-changing tone primary color pictures into a plurality of regions as the tone differences among the pixels belonging to the same region are smaller than a critical value and the tone differences between neighboring regions are larger than the critical value, and for reckoning an average-tone of the pixels in every region;

a boundary-extracting device for extracting boundaries dividing neighboring regions as a series of another coordinate points defined at corners of pixels;

a branch point-extracting device for extracting points which are in contact with three or more than three regions on the boundaries extracted by the boundary extracting device as branch points;

a boundary memory device for memorizing two-dimensional coordinates (x, y) of the points on boundary intervals divided by the branch points;

a turning point-extracting device for extracting points at which a boundary interval turns at an angle more than a definite value as turning points which divide the boundary interval into a plurality of subboundaries;

a boundary-approximating device for approximating a series of points in every subboundary divided by branch points or turning points by using single-variable spline functions where t is an intermediate, independent variable and x and y are dependent variables, and for producing approximation functions of the series of points by repeating approximation of every subboundary by using a least square error method or a biorthonormal function method till errors become smaller than a critical value;

a regional data memory device for memorizing information of the approximation functions of the subboundaries and relations of the subboundaries to the regions;

a differential image production device for producing a differential tone image by subtracting the average-tone image from the input image at all pixels;

a differential image memory device for memorizing differential tones of the pixels aligning in x-direction and in y-direction in the differential tone image;

a differential image division device for dividing a differential image into a plurality of blocks;

a differential block memory device for memorizing the differential tones of every block by corresponding to the pixels aligning in x-direction and in y-direction;

data approximation device for approximating differential block images by two-variable spline functions and for producing approximation functions of every block image as compressed data by repeating a least square method or a biorthonormal function method till errors become smaller than a critical value;

a compressed data memory device for memorizing parameters of the approximation functions of the differential image;

an encoding device for encoding the compressed data;

an encoded data outputting device for outputting encoded data; and an encoded data memory device for memorizing the encoded data;

the transmitting system comprising:

a communication data producing device;

a communication data transmitting device;

a data transmitting medium;

a communication data receiving device; and an encoded data inputting device;

the data-receiving side comprising:

a decoding device for retrieving the compressed data by decoding the encoded, input data;

a differential block revival device for regenerating differential block images from the compressed data;

a differential image retrieve device for retrieving the entirety of differential images by assembling all differential blocks;

a continual tone image regeneration device for regenerating a continually-changing tone image of each primary color by reviving regions, making an average tone image and adding the average tone image on the differential image;

a color synthesis device for synthesizing the continually-changing tone images of the primary colors together into a unified color image; and a color picture outputting device for outputting the unified color picture.

4. A communication apparatus for color pictures comprising a data-sending side, a data-receiving side and a transmitting system for transmitting data between the data-sending side and the data-receiving side;

the data-sending side comprising:

a color image memory device for reading in the data of a color picture by optically reading device, e.g. an image scanner, a digital camera, taking a color picture from an image data base or inputting the data of a color picture directly, and for memorizing continually-changing tones of primary colors of the input color picture by corresponding tones of primary colors to coordinate points taken at centers of individual pixels aligning in a horizontal direction and in a vertical direction on an image plane;

a color resolution device for resolving data of the input image into a plurality of primary color images and making data of the continually-changing tones of the primary colors;

an image memory device for memorizing tones of pixels of primary color images resolved by the color resolution device by corresponding tones of pixels to coordinate points taken at centers of individual pixels aligning in a horizontal direction and in a vertical direction on an image plane;

a region division device for dividing each of the continually-changing tone primary color pictures into a plurality of regions as the tone differences among the pixels belonging to the same region are smaller than a critical value and the tone differences between neighboring regions are larger than the critical value, and for reckoning an average-tone of the pixels in every region;

a boundary-extracting device for extracting boundaries dividing neighboring regions as a series of another coordinate points defined at corners of pixels;

a branch point-extracting device for extracting points which are in contact with three or more than three regions on the boundaries extracted by the boundary extracting device as branch points;

a boundary memory device for memorizing two-dimensional coordinates (x, y) of the points on boundary intervals divided by the branch points;

a turning point-extracting device for extracting points at which a boundary interval turns at an angle more than a definite value as turning points which divide the boundary interval into a plurality of subboundaries;

a boundary-approximating device for approximating a series of points in every subboundary divided by branch points or turning points by using single-variable spline functions where t is an intermediate, independent variable and x and y are dependent variables, and for producing approximation functions of the series of points by repeating approximation of every subboundary by using a least square error method or a biorthonormal function method till errors become smaller than a critical value;

a regional data memory device for memorizing information of the approximation functions of the subboundaries and relations of the subboundaries to the regions;

a differential image production device for producing a differential tone image by subtracting the average-tone image from the input image at all pixels;

a differential image memory device for memorizing differential tones of the pixels aligning in x-direction and in y-direction in the differential tone image;

a data approximation device for approximating differential tone image by two-variable spline functions and for producing approximation functions of the differential tone image as compressed data by repeating a least square method or a biorthonormal function method till errors become smaller than a critical value;

a compressed data memory device for memorizing parameters of the approximation functions of the differential image;

an encoding device for encoding the compressed data;

an encoded data outputting device for outputting encoded data; and an encoded data memory device for memorizing the encoded data;

the transmitting system comprising:

a communication data producing device;

a communication data transmitting device;

a data transmitting medium;

a communication data receiving device; and an encoded data inputting device;

the data-receiving side comprising:

a decoding device for retrieving the compressed data by decoding the encoded, input data;

a differential image retrieve device for regenerating the differential tone image from the compressed data;

a continual tone image regeneration device for regenerating a continually-changing tone image of each primary color by reviving regions, making an average tone image and adding the average tone image to the differential image;

a color synthesis device for synthesizing the continually-changing tone images of the primary colors together into a unified color image; and a color picture outputting device for outputting the unified color picture.

* * * * *